(12) United States Patent
Geissler

(10) Patent No.: US 7,965,188 B2
(45) Date of Patent: *Jun. 21, 2011

(54) RADIO FREQUENCY ANIMAL TRACKING SYSTEM

(75) Inventor: Randolph K. Geissler, Hudson, WI (US)

(73) Assignee: Destron Fearing Corporation, South St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/608,206

(22) Filed: Oct. 29, 2009

(65) Prior Publication Data

US 2010/0045468 A1 Feb. 25, 2010

Related U.S. Application Data

(63) Continuation of application No. 11/282,295, filed on Nov. 17, 2005, now Pat. No. 7,619,522.

(60) Provisional application No. 60/629,013, filed on Nov. 17, 2004, provisional application No. 60/706,645, filed on Aug. 9, 2005, provisional application No. 60/722,138, filed on Sep. 30, 2005.

(51) Int. Cl.
*G08B 13/14* (2006.01)

(52) U.S. Cl. .................. 340/572.1; 340/10.4; 340/573.3

(58) Field of Classification Search ............... 340/572.1, 340/572.2, 573.1–573.3, 10.4–10.42
See application file for complete search history.

(56) References Cited

U.S. PATENT DOCUMENTS

| | | |
|---|---|---|
| 3,934,368 A | 1/1976 | Fearing |
| 3,987,570 A | 10/1976 | McMurray et al. |
| 4,060,921 A | 12/1977 | Robinson |
| RE29,536 E | 2/1978 | Fearing |
| 4,176,482 A | 12/1979 | Steckel |
| 4,209,924 A | 7/1980 | Fearing |
| 4,250,643 A | 2/1981 | Mackenzie |
| 4,425,726 A | 1/1984 | Dvorak |
| RE31,632 E | 7/1984 | Murphy et al. |
| 4,470,212 A | 9/1984 | Stafford et al. |
| 4,209,924 A | 10/1985 | Fearing |
| 4,581,834 A | 4/1986 | Zatkos et al. |
| 4,612,877 A | 9/1986 | Hayes et al. |
| 4,635,389 A | 1/1987 | Oudelette |
| 4,653,208 A | 3/1987 | Wassilieff |
| 4,691,458 A | 9/1987 | Scott |
| 4,741,117 A | 5/1988 | Fearing |

(Continued)

FOREIGN PATENT DOCUMENTS

EP 0 670 562 9/1995

(Continued)

OTHER PUBLICATIONS

"FDX Lightweight Ultra Bovine EID Tag ISO Compliant," Allflex USA, Inc., www.allfexusa.com, 10 pages (2004).

(Continued)

*Primary Examiner* — Thomas J Mullen
(74) *Attorney, Agent, or Firm* — Merchant & Gould P.C.

(57) ABSTRACT

An RFID system provides a transponder that can communicate over at least two different frequencies so that the real time performance of the transponder can be improved without losing backwards compatibility. The RFID system allows the end user to customize and program identification tags. The RFID system also provides an ear tag, which may be in button form, for use on livestock with superior durability and overall performance in the field.

14 Claims, 16 Drawing Sheets

U.S. PATENT DOCUMENTS

| | | | |
|---|---|---|---|
| 4,953,313 A | 9/1990 | Scott |
| 4,958,452 A | 9/1990 | Tate |
| 5,051,741 A | 9/1991 | Wesby |
| 5,228,224 A | 7/1993 | Gardner |
| 4,953,313 A | 9/1993 | Scott |
| 5,302,954 A | 4/1994 | Brooks et al. |
| 5,308,351 A | 5/1994 | Nehls |
| 5,347,280 A | 9/1994 | Schuermann |
| 5,446,447 A | 8/1995 | Carney et al. |
| 5,450,492 A | 9/1995 | Hook et al. |
| 5,461,806 A | 10/1995 | Bristow, Jr. |
| 5,473,830 A | 12/1995 | Doble |
| 5,477,215 A | 12/1995 | Mandelbaum |
| 5,510,769 A | 4/1996 | Kajfez et al. |
| 5,520,417 A | 5/1996 | Kennemer |
| 5,675,920 A | 10/1997 | Long |
| 5,680,106 A | 10/1997 | Schrott et al. |
| 5,725,261 A | 3/1998 | Rahn |
| 5,812,065 A | 9/1998 | Schrott et al. |
| 5,883,582 A | 3/1999 | Bowers et al. |
| 5,936,527 A | 8/1999 | Isaacman et al. |
| 5,964,656 A | 10/1999 | Lawler, Jr. et al. |
| 6,021,592 A | 2/2000 | Caisley |
| 6,055,752 A | 5/2000 | Ritchey |
| 6,107,910 A | 8/2000 | Nysen |
| 6,127,928 A | 10/2000 | Issacman et al. |
| 6,145,225 A | 11/2000 | Ritchey |
| 6,145,226 A | 11/2000 | Finlayson |
| 6,154,139 A | 11/2000 | Heller |
| 6,163,259 A | 12/2000 | Barsumian et al. |
| 6,196,912 B1 | 3/2001 | Lawler, Jr. et al. |
| 6,211,789 B1 | 4/2001 | Oldham et al. |
| 6,231,435 B1 | 5/2001 | Pilger |
| 6,329,920 B1 | 12/2001 | Morrison et al. |
| 6,342,839 B1 | 1/2002 | Curkendall et al. |
| 6,346,884 B1 | 2/2002 | Uozumi et al. |
| 6,346,885 B1 | 2/2002 | Curkendall |
| 6,362,737 B1 | 3/2002 | Rodgers et al. |
| 6,366,206 B1 | 4/2002 | Ishikawa et al. |
| 6,371,375 B1 | 4/2002 | Ackley et al. |
| 6,375,612 B1 | 4/2002 | Guichon et al. |
| 6,377,203 B1 | 4/2002 | Doany |
| 6,405,462 B1 | 6/2002 | Gardner et al. |
| 6,439,169 B1 | 8/2002 | Miyawaki |
| 6,480,100 B1 | 11/2002 | Frieden et al. |
| 6,480,699 B1 | 11/2002 | Lovoi |
| 6,509,828 B2 | 1/2003 | Bolavage et al. |
| 6,510,630 B1 | 1/2003 | Gardner |
| 6,531,957 B1 | 3/2003 | Nysen |
| 6,545,604 B1 | 4/2003 | Dando et al. |
| 6,554,188 B1 | 4/2003 | Johnson et al. |
| 6,566,997 B1 | 5/2003 | Bradin |
| 6,569,092 B1 | 5/2003 | Guichon et al. |
| 6,598,800 B1 | 7/2003 | Schmit et al. |
| 6,608,561 B2 | 8/2003 | Lawler, Jr. et al. |
| 6,613,179 B1 | 9/2003 | McCoy et al. |
| 6,649,403 B1 | 11/2003 | McDevitt et al. |
| 6,664,897 B2 | 12/2003 | Pape et al. |
| 6,666,170 B1 | 12/2003 | Hilpert |
| 6,698,119 B2 | 3/2004 | Jacob et al. |
| 6,700,547 B2 | 3/2004 | Mejia et al. |
| 6,708,881 B2 | 3/2004 | Hartmann |
| 6,713,298 B2 | 3/2004 | McDevitt et al. |
| 6,720,930 B2 | 4/2004 | Johnson et al. |
| 6,724,309 B2 | 4/2004 | Grose et al. |
| 6,745,008 B1 | 6/2004 | Carrender et al. |
| 6,825,763 B2 | 11/2004 | Ulrich et al. |
| 6,831,562 B2 | 12/2004 | Rodgers et al. |
| 6,840,440 B2 | 1/2005 | Uozumi et al. |
| 6,847,892 B2 | 1/2005 | Zhou et al. |
| 6,859,672 B2 | 2/2005 | Roberts et al. |
| 6,878,052 B2 | 4/2005 | Andersson |
| 6,916,295 B2 | 7/2005 | Tasch et al. |
| 6,982,646 B2 | 1/2006 | Rodgers et al. |
| 6,983,687 B2 | 1/2006 | McCoy |
| 6,988,080 B2 | 1/2006 | Zack et al. |
| 7,009,515 B2 | 3/2006 | Carrender |
| 7,019,639 B2 | 3/2006 | Stilp |
| 7,019,650 B2 * | 3/2006 | Volpi et al. ............ 340/572.1 |
| 7,023,341 B2 | 4/2006 | Stilp |
| 7,030,811 B2 * | 4/2006 | Goren et al. ............ 342/387 |
| 7,049,942 B2 | 5/2006 | Gallovich |
| 7,079,020 B2 | 7/2006 | Stilp |
| 7,082,344 B2 | 7/2006 | Ghaffari |
| 7,084,756 B2 | 8/2006 | Stilp |
| 7,091,860 B2 | 8/2006 | Martinez de Velasco Cortina et al. |
| 7,098,793 B2 | 8/2006 | Chung |
| 7,106,189 B2 | 9/2006 | Burneske et al. |
| 7,106,266 B1 * | 9/2006 | Pauley ................. 340/572.2 |
| 7,116,212 B2 | 10/2006 | Horwitz et al. |
| 7,116,230 B2 | 10/2006 | Klowak |
| 7,142,118 B2 | 11/2006 | Hamilton et al. |
| 7,158,030 B2 | 1/2007 | Chung |
| 7,167,095 B2 | 1/2007 | Carrender |
| 7,242,306 B2 | 7/2007 | Wildman et al. |
| 7,248,933 B2 | 7/2007 | Wildman |
| 7,250,917 B1 | 7/2007 | Thompson et al. |
| 7,252,230 B1 | 8/2007 | Sheikh et al. |
| 7,256,696 B2 | 8/2007 | Levin |
| 2002/0010390 A1 | 1/2002 | Guice et al. |
| 2002/0148146 A1 | 10/2002 | Hogan |
| 2002/0188470 A1 | 12/2002 | Hogan |
| 2003/0038721 A1 | 2/2003 | Hogan |
| 2003/0121188 A1 | 7/2003 | Haar et al. |
| 2004/0021313 A1 | 2/2004 | Gardner et al. |
| 2004/0027251 A1 | 2/2004 | Sharony |
| 2004/0074976 A1 | 4/2004 | Becker et al. |
| 2004/0144004 A1 | 7/2004 | Constatini |
| 2004/0150528 A1 | 8/2004 | Natividade et al. |
| 2004/0211332 A9 | 10/2004 | Apana et al. |
| 2005/0024183 A1 | 2/2005 | Carter et al. |
| 2005/0052283 A1 | 3/2005 | Collins et al. |
| 2005/0075900 A1 | 4/2005 | Arguimbau, III |
| 2005/0115507 A1 | 6/2005 | Halachmi et al. |
| 2005/0145187 A1 | 7/2005 | Gray |
| 2005/0161007 A1 | 7/2005 | Huisma et al. |
| 2006/0038658 A1 | 2/2006 | Jarvis et al. |
| 2006/0097874 A1 | 5/2006 | Salesky et al. |
| 2006/0202835 A1 * | 9/2006 | Thibault ................ 340/573.1 |

FOREIGN PATENT DOCUMENTS

| | | |
|---|---|---|
| EP | 1 438 607 B1 | 4/2009 |
| WO | WO 99/27777 | 6/1999 |
| WO | WO 02/060244 A1 | 8/2002 |
| WO | WO 03/051108 A2 | 6/2003 |
| WO | WO 03/079773 A1 | 10/2003 |
| WO | WO 2005/034617 A1 | 4/2005 |

OTHER PUBLICATIONS

"Product Information," Y-Tex Corporation, 4 pages (Date Unknown).
"RFID The Next Generation in AIDC," www.satoworldwide.com, pp. 1-53 (Oct. 29, 2004).
International Search Report mailed Jul. 26, 2006.

* cited by examiner

RADIO FREQUENCY ANIMAL TRACKING SYSTEM

CROSS REFERENCE TO RELATED APPLICATIONS

This application is a continuation of application Ser. No. 11/282,295, filed Nov. 17, 2005, now issued as U.S. Pat. No. 7,619,522, which claims the benefit of provisional application Ser. Nos. 60/629,013, filed Nov. 17, 2004; Ser. No. 60/706,645, filed Aug. 9, 2005; and Ser. No. 60/722,138, filed Sep. 30, 2005, which are incorporated herein by reference in their entirety.

FIELD

The invention relates to a radio frequency identification system and more particularly to a radio frequency identification system for tracking animals.

BACKGROUND

Radio frequency identification (RFID) systems are well known. RFID systems are either active systems wherein the transponder includes its own power source or passive systems wherein the transponder receives its power from a base station. Since passive RFID systems do not require their own power source they are generally smaller, lighter, and cheaper to manufacture than active RFID systems. Consequently, passive systems are more commonly employed in RFID systems for the purpose of tracking as compared to active systems.

Passive RFID systems are generally either inductively coupled RFID systems or capacitively coupled RFID systems. The present disclosure is applicable to both types of passive systems; however, the present description focuses on inductively coupled systems because they are presently more common due to the fact that they have a greater effective range than capacitively coupled systems. Passive inductively coupled RFID systems typically include a transponder that has a microprocessor chip encircled by, and electrically connected to, a metal coil that functions as an antenna as well as an inductance element. The metal coil receives radio frequencies from a base station and generates an electrical current that powers the microprocessor, which is programmed to retrieve stored data such as an identification number and transmit the data back to the base station.

Standard transmission frequencies have been established for RFID tags based upon their field of use. For example, 13.56 MHz is a standard radio frequency used for tracking manufactured goods, whereas 400 kHz is a standard radio frequency used for tracking salmon as they travel upstream to spawn. The standard radio frequency used for identification tags for livestock and other animals is currently 134.2 kHz. This relatively low radio frequency is advantageous because it can effectively penetrate water-containing objects such as animals. On the other hand, the frequency does not have a high transmission rate. Therefore, current RFID systems do not work well where fast data transmission is required, such as in certain real time tracking applications of fast moving objects. More particularly, due to the inherent signal transmission delay associated with current RFID systems operated at 134.2 kHz, current systems cannot in certain circumstances effectively query and retrieve identification numbers, also commonly referred to as identification codes, from identification tags as the animals move rapidly past a particular point in space, such as when cattle move along a cattle chute commonly found at auctions or disassembly plants. Accordingly, an improved RFID system with faster data transmission capabilities is desirable.

Unique challenges are associated with tracking livestock. In view of deadly livestock diseases such as Bovine Spongiform Encephalopathy more commonly known as Mad Cow disease, which have been known to infect herds and meat products, there is a strong global public interest in tracking livestock. As such, tracking livestock is increasingly becoming more common as well as highly regulated. One common means to track livestock requires livestock ranchers to apply for government-issued livestock identification numbers, which are forwarded to designated RFID tag manufacturers to be written into identification tags that are subsequently packaged and sold to the end user through authorized distributors. This complex multi-layered and multi-stepped process of manufacture and distribution is inefficient and costly. Accordingly, streamlining the process by providing a method and apparatus for manufacturing and/or processing the tags is desirable.

In addition, current identification tags manufactured according to the above outlined processes are typically not customizable by the end users and generally include only a stored identification number. Hence, if the producer wishes to track other data, the data must, for example, be stored on a separate computer and electronically associated with an identification number. This limitation may necessitate carrying a computer out in the field, which can be inconvenient and impractical. In addition, once the livestock changes hands, the new livestock handler may not have access to the data that is associated with the identification number because the data is not transferred to the new handler. Instead, the data must be stored on a network or otherwise deliberately made available to the new handler. Furthermore, current identification tags are not generally adapted to be used to measure physical parameters of the animals such as the animal's internal temperature, which can be helpful in determining if the animal is ill. Accordingly, it is desirable to developed an RFID system where the livestock handler can customize the identification tag; where data in addition to an identification number can be stored in the tag itself, where the livestock handler can use the tag to track physical parameters of the livestock in real time; and/or where the system remains compatible with current base stations.

SUMMARY

The invention is directed to an improved RFID system, methods of using the system, and methods of making the system. In an embodiment, the system includes a transponder that can communicate over at least two different frequencies. Such an embodiment can provide improved real time performance of the transponder without losing backwards compatibility. In an embodiment, the system includes an improved apparatus and method that allows the end user to customize and program identification tags. The invention includes the tags including user provided data in print and/or in electronic form. In an embodiment, the system can provide an ear tag for use on livestock that exhibits advantageous performance in the field, shelter, and/or plant.

According to one embodiment, a radio frequency identification (RFID) tag for identification of animals includes a first antenna and a transponder coupled to the antenna. The transponder includes a first transmission unit, first memory and first power circuitry. The first power circuitry is configured to receive a current induced in the first antenna, and to power the first transmission unit and first memory. The first transmission unit is configured to retrieve data stored in the first memory and to transmit at least a portion of the data via the first antenna on a first carrier frequency and on a second carrier frequency.

According to another embodiment, a method of manufacturing a radio frequency identification (RFID) tag, for identification of animals includes providing a substrate, and disposing a first coil upon the substrate. A first integrated circuit is coupled to the first coil. A first material is formed atop the first coil and first integrated circuit. A second material is formed over the first material.

According to yet another embodiment, a method of collision prevention for radio frequency identification (RFID) tags for identification of animals includes assigning each of a plurality of RFID tags a delay value. Each RFID tag is configured to receive a query from a base station, and to respond thereto by waiting for a duration of time corresponding to the delay value. Then, a response transmission is provided. The response transmission includes a unique identification number identifying an animal associated with the tag.

According to yet another embodiment, a method of providing identification of an animal includes receiving a query from a base station with a radio frequency identification (RFID) tag in an animal. The query is responded to with a first transmission on a first carrier frequency and a second transmission on a second carrier frequency.

According to yet another embodiment, a method of identifying an animal to a base station with a radio frequency identification (RFID) tag includes providing the base station with a smallest identification number assigned to any of a plurality of RFID tags associated with a plurality of animals. A query from the base station is received with an RFID tag in the animal. The RFID tag being is a unique identification number. The received query is responded to with a reply transmission including an abbreviated identification number, which is the difference between the unique identifying number and the smallest identification number.

According to yet another embodiment, a system for identifying animals with radio frequency identification (RFID) tags includes a first base station configured to operate at a first carrier frequency. The system also includes a second base station configured to operate at a second carrier frequency. The system further includes a plurality of RFID tags each associated with one of a plurality of animals. Each RFID tag is configured to respond to a transmission on a first carrier frequency with a response transmission on the first carrier frequency and a response transmission on a second carrier frequency. At least one of the response transmissions includes a unique identification number.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows.

DETAILED DESCRIPTION

Definitions

Figure 1:
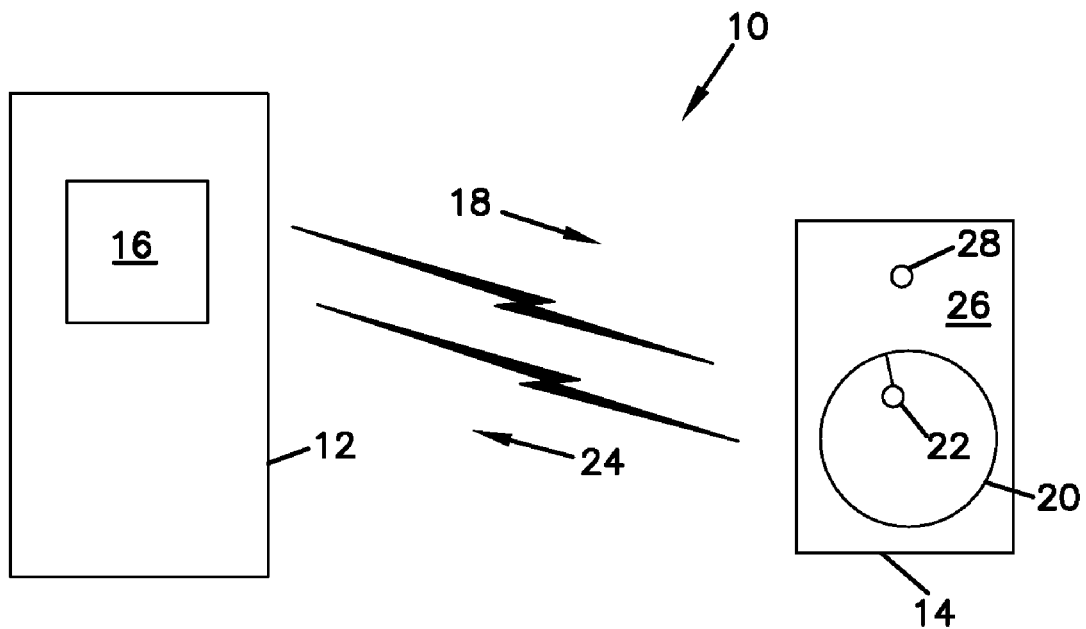
FIG. 1 is a diagrammatic illustration of a known RFID system commonly used to track livestock.

As used herein, the term "animal" refers to macroscopic animals including vertebrates. Animals include domesticated animals, such as livestock and companion animals, and wild animals, such as game animals or fish. Livestock include animals such as swine (pig), piglet, sheep, lamb, goat, bovine (e.g., cow), fish and (e.g., salmon), birds (e.g., chickens, ducks, and geese). This list of animals is intended to be illustrative only, and should not limit the scope of any of the following disclosure related to the present invention. As used herein, the term "track" refers to the identification, location, recording, and monitoring of animals or other objects of interest, for whatever purpose or reason. This definition is illustrative of uses of the present invention and is not intended to limit the scope of any of the following disclosure related to the present invention.

The Present Tag, Method, and System

An identification tag for an animal, the tag including a first circuit including a memory subunit, a power subunit, and a first transmit subunit, the subunits electrically connected to each other. The tag also includes a second circuit including a second transmit subunit, the second circuit electrically connected to the first circuit, and an antenna connected to the first circuit. The power subunit of the first circuit is configured to generate an electrical current when a radio signal is received by the antenna, and delivers this current to the first transmit subunit. The first transmit subunit is configured to transmit a first signal at a first frequency when it receives electrical current from the power subunit, the first signal encoding at least a first portion of any data within the memory subunit. The second circuit is configured to transmit a second signal at a second frequency when it when it receives electrical current from the power subunit, the second signal encoding at least a second portion of any data within the memory subunit.

A method of making an identification tag for an animal including providing a producer of animals, at least one animal, an animal identification tag with a data transponder and a memory storage, and a tag printer located adjacent a space for confining the at least one animal. At least one registration code is acquired to be assigned to the at least one animal. The at least one registration code is input to the tag printer. The animal is positioned in the confined space adjacent the tag printer. The animal identification tag is positioned within the tag printer. The registration code is printed on an exterior of the animal identification tag. The registration code is written into the memory storage of the animal identification tag. The animal identification tag is removed from the machine and attached to the animal.

An animal identification tag includes a flexible substrate including upper and lower portions. A substantially rigid transponder mount is positioned between the upper and lower portions. A transponder is mounted to the transponder mount. The transponder includes a data memory storage, an antenna, power circuitry and transmission circuitry. The power circuitry is configured to generate electrical current when a first radio signal at a first frequency is received by the antenna. The transmission circuitry is configured to transmit at least a portion of any data within the data memory storage at a second frequency, and to transmit at least a portion of any data within the data memory storage at a second frequency when electrical current is received from the power circuitry. A mounting opening extends through the upper and lower portions and a mounting opening reinforcement mounted between the upper and lower bodies adjacent the mounting opening.

A device for making animal identification tags including a housing with a path along which an animal identification tag may be positioned. A data writing apparatus is located within the housing adjacent the path and positioned to write digital information to a data storage of the animal identification tag. A printing device is located within the housing adjacent the path and positioned to print information on an exterior of the animal identification tag. An optical scanner is located within the housing and positioned adjacent the path to optically scan the printed information on the exterior of the animal identification tag. A radio frequency generator and receiver is located within the housing and positioned adjacent the path to query the digital information written into the data storage of the animal identification tag.

A method of tracking livestock includes registering an identification code with a central database, wherein registering includes associating the identification code with a user name. A passive radio frequency identification tag is provided. The identification code is written to the passive radio frequency identification tag. Subsequently additional data is written to the passive radio frequency identification tag.

A method of tracking livestock including registering an identification code with a central database, wherein registering includes associating the identification code with a user name. A passive radio frequency identification tag is provided. The identification code is written to the passive radio frequency identification tag at a physical location where an animal to be tracked is located.

A method of tracking livestock including registering an identification code with a central database, wherein registering includes associating the identification code with a user name. A passive radio frequency identification tag is provided. The identification code is written to the passive radio frequency identification tag. The passive radio frequency identification tag is queried using a first frequency and transmits a response at a second frequency.

A radio frequency identification tag includes a flexible substrate and a transponder position within the flexible substrate. The transponder includes a passive inductance radio frequency device positioned within a substantially rigid housing.

The present invention includes an animal, the animal including coupled to an appendage (e.g., an ear) a tag according to the present invention.

Illustrated Embodiments

Referring to FIG. 1, a conventional RFID system 10 is shown. The conventional RFID system 10 includes a base station 12, also commonly referred to as a reader, and a transponder 14, also commonly referred to as an identification tag. In the depicted RFID system 10, the transponder 14 and base station 12 are configured to be used to track livestock. In particular, the base station 12 and transponder 14 are configured to transmit and receive radio waves at the current industry standard for RFID livestock tracking, which is 134.2 kHz. The base station includes a transceiver 16 that emits a radio signal 18, which may be received by the transponder 14. The transponder 14 includes a wire loop antenna 20 constructed of metal. The wire loop antenna 20 receives the signal 18 and functions as an inductor to generate an electric current from the signal 18. The generated electric current powers the semiconductor chip 22, which is programmed to retrieve a stored identification number/code and convert the number into a signal 24 that is transmitted back to the transceiver 16 in the base station 12. In the embodiment shown, the transponder 14 includes a substantially rigid housing 26 that protects the wire loop antenna 20 from bending which would likely otherwise impede or destroy the wire loop antenna's 20 ability to perform. In some embodiments, the housing may be made in the form of a plastic disk and include a hole that is sized to receive a fastener for attaching the housing 26 directly to the ear of an animal.

A conventional RFID system 10 like the one described above may perform poorly in identifying animals if they move rapidly past a point in space, such as a gate at a cattle ranch. The conventional RFID system 10 may perform poorly due to the length of time between the sending of the signal 18 from the base station 12 and the receipt of the return signal 24 at the base station 12. During this time the animal can move, thereby making it difficult to associate the received number with the correct animal. During this time the animal may even move out of the communication range of the base station 12. This task of identifying animals in a dynamic environment is especially difficult when there are other animals of similar appearance nearby. Increasing the overall frequency of transmission, which can increase data transmission rates, presents one way to decrease the time period and improve the systems. However, such a change would require establishing a new industry standard and might also render all the existing systems and components thereof useless.

Figure 2:
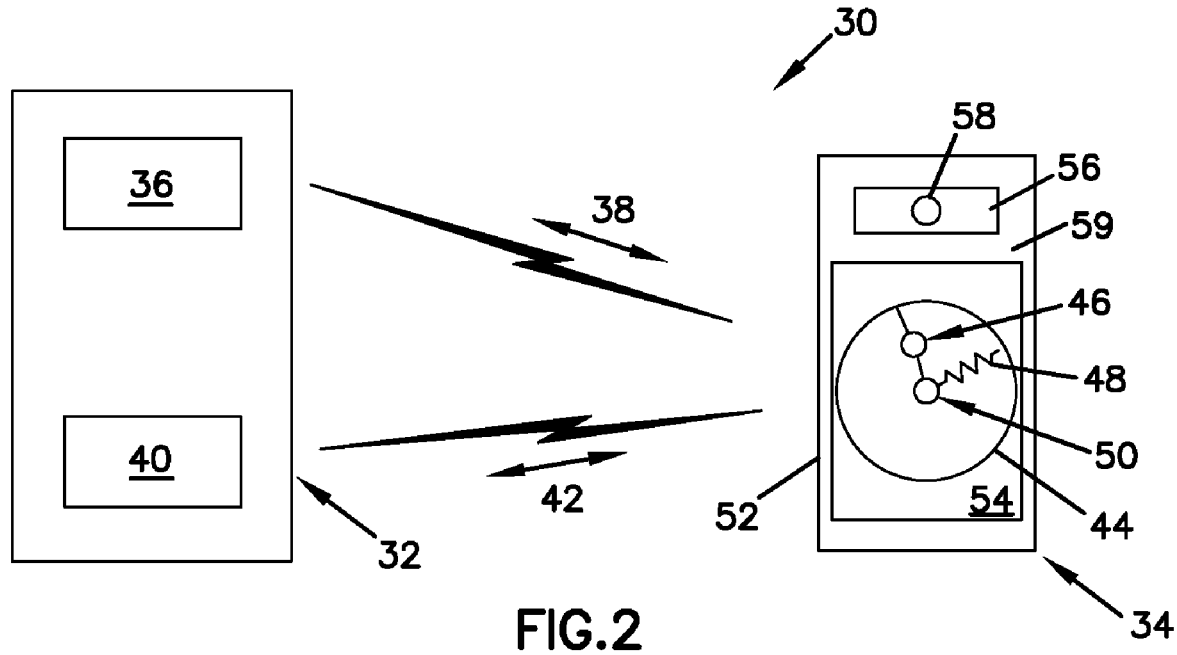
FIG. 2 is a diagrammatic illustration of an RFID system according to the principles of the present invention.

Referring to FIG. 2, a first embodiment of an RFID system 30 according to the present invention is shown. In the depicted embodiment the RFID system 30 includes a base station 32 and a transponder 34. The base station 32 includes a first device 36 for transmitting and receiving signals at a first frequency 38 and a second device 40 for transmitting and receiving signals at a second frequency 42. In an embodiment, the first frequency 38 can be the standard frequency of 134.2 kHz and the second frequency 42 can be a higher frequency than the first frequency 38. The transponder 34 includes an antenna, e.g., a wire loop antenna 44, that is configured to receive and transmit on the first frequency 38. The depicted wire loop antenna 44 is made of metal and also functions as an inductor to generate an electrical current for powering a first semiconductor chip 46. The first semiconductor chip 46 can be programmed to retrieve a stored identification number and transmit that identification number back to the first device 36 of the base station 32 over the first frequency 38. In addition, the first semiconductor device 46 can be programmed to transmit the identification number back to the second device 40 of the base station 32 over the second frequency 42 via a second antenna 48. This alternative mechanism for transmitting back to the base station can decrease the response time of the RFID system 30. At the same time, the RFID system 30 can be configured to remain compatible with existing systems that operate at lower frequencies.

In the depicted embodiment, the transponder 34 further includes a second semiconductor chip 50 that is electrically connected to the first semiconductor chip 46. The second semiconductor chip 50 is shown powered by the current generated by the metal wire loop antenna 44. The second semiconductor chip 50 may be configured to transmit a signal at second frequency 42. In some embodiments, the second semiconductor chip 50 is configured so that the first semiconductor chip 46 of the RFID system 30 is very similar or even identical to the semiconductor chip 22 of the known RFID system 10.

Still referring to FIG. 2, in the depicted embodiment the second chip 50 may include a writeable memory device for storing customizable programmable data. Second semiconductor chip 50 can store any of a variety of data about an animal. For example, the health history, genetic characteristics, the date and location of sale, as well as other data may be stored on the second semiconductor chip 50. Alternatively, such data can be written to a data storage location of the first semiconductor chip 46. This data from the first semiconductor chip 46 could be transmitted to the base station 32 at the second higher frequency via the second semiconductor chip 50. Alternatively, the customizable programmable data can be transmitted to the base station 32 at the first frequency via the first semiconductor chip. The second frequency 42 can be beneficial when the medium of transfer is air, which allows for higher frequency rates and, consequently, faster rates of transfer than other materials such as water or cement.

In the various embodiments herein, the communication link(s) (e.g., communication links 38 and 42) may be conducted in either half duplex or full duplex. Thus, in the context of a half duplex embodiment, a base station, such as the base station 32 depicted in FIG. 2, may transmit a relatively low frequency carrier (e.g., 134.2 kHz) to the transponder 34, thereby transferring power to its internal circuitry. The transponder 34 is configured to receive energy during this period, but to delay its return transmission(s), until the base station 32 ceases transmission. After having transferred energy to the base station 32, the base station 32 ceases its transmission, and enters a period wherein its transceiving devices 36 and 40 attempt only reception of data. During this period, the transponder 34 may respond with one or more return transmissions. For example, the transponder 34 may simultaneously return transmission on both high and low frequency carriers 38 and 42. Alternatively, the transponder 34 may divide this period into two timeframes—a first timeframe, during which transmission on the low frequency carrier 38 is performed, and a second timeframe, during which transmission on the high frequency carrier 42 is performed. In the wake of having received a return transmission, the base station 32 may re-enter its energy transfer phase, thereby beginning the cycle anew. In contrast, in the context of a full duplex embodiment, transmissions to and from a base station, such as base station 32, and a transponder, such as transponder 34, occur simultaneously.

Full duplex schemes exhibit the quality of permitting a greater quantity of data to be communicated in a given interval of time. For this reason, under certain circumstances, full duplex embodiments may be desirable. On the other hand, half duplex systems may allow for a more reliable return communication from a transponder. In certain environments, the signal emanating from the base station may reflect off of one or more surfaces, and return to the base station. In such a circumstance, if the communication was conducted in full duplex, the base station would also be receiving a return transmission from the transponder, meaning that the reflected signal and the return transmission would interfere with one another. A half duplex system reduces such interference by delaying return transmissions until the base station is no longer transmitting (when the base station ceases transmission, it ceases to emit signals that can be reflected back to itself, causing the unwanted interference). Half duplex systems possess other advantages in terms of simplicity and cost, as well.

In alternative embodiments, the second semiconductor chip 50 can be configured to communicate with an implanted biosensor, which can detect a physical characteristic including, for example, the animal's temperature and/or blood characteristics. Such a sensor may be integrated with transponder 34 or may be separately implanted inside the animal. In embodiments where the transponder 34 is separate from the sensors, the sensors may communicate with transponder 34, which in turn communicates with the base station 32. In such embodiments, the data can be sent back to the base station 32 for analysis via the first frequency 38 from the wire loop antenna 44 or the second frequency 42 from the second antenna 48. Depending on the surrounding conditions, the first or second frequency may be preferred. For example, if only air separates the transponder 34 and the base station 32, the faster, higher frequency may be preferred because of the fast transmission rate, whereas if there are cement walls or other solid or water-containing objects between the base station 32 and the transponder 34, then the lower frequency may be preferred due to its ability to penetrate objects. Alternatively, it should be appreciated that the biosensors could also communicate directly with the base station 32.

The transponder's 34 ability to store more data than an identification number can be beneficial because, for example, a tagged animal is often handled or processed by a number of different individuals. Ensuring that each individual has access to the data associated with the animal when the data is stored remotely from the animal can be difficult and expensive. However, when the data in the RFID system 30 is stored on the semiconductor chip 50 that is attached to the animal, the handler of the animal can gain access to the relevant information about the animal.

Still referring to FIG. 2, the transponder 34 is shown as an embodiment of an identification tag 52 configured to attach to an animal. The tag can be configured to attach to any of a variety of parts of an animal, such as to a wing, leg, ear, fin, flipper, tail, or any other suitable appendage or portion of the body of the animal or object to be tracked. In an embodiment, identification tag 52 is configured to attach to the ear of an animal, for example, an ear of a cow. The identification tag 52 is shown to include optional protective housing 54 and optional grommet 56 that are contained and/or sealed within a flexible outer shell 59. In an embodiment, the protective housing 54 houses the wire loop antenna 44. The protective housing 54 in the depicted embodiment houses the wire loop antenna 44, the second antenna 48, and the first and second semiconductor chips 46 and 50, respectively. In this embodiment, the protective housing 54 is designed to protect the electronic components of the transponder 34 from damage as a result of physical trauma such as bending or crushing. The protective housing 54 is, thus, generally at least semi-rigid. In some embodiments, the housing may be made in the form of a plastic disk and include a hole that is sized to receive a fastener for attaching the housing 54 directly to the ear of an animal.

In the depicted embodiment, the identification tag 52 is constructed to be connected to the animal's ear with a fastener. The grommet 56 prevents the area of the identification tag 52 that engages the fastener from ripping or tearing due to concentrated physical stresses at the point of engagement. The grommet 56 is shown as a tab of reinforced material. The grommet 56 can be constructed of many different types of materials including, for example, metal, plastic, or nylon. The flexible outer shell 59 of the identification tag 52 encloses the housing 54 and can seal the protective housing 54 and the reinforced material of the grommet 56 from the external environment. The inclusion of the flexible outer shell 59 makes the entire identification tag 52 more likely to yield when it impacts foreign objects such as fence posts and the like. Accordingly, the arrangement including the flexible outer shell 59 decreases the chance that the identification tag 52 would injure an animal.

Figure 3:
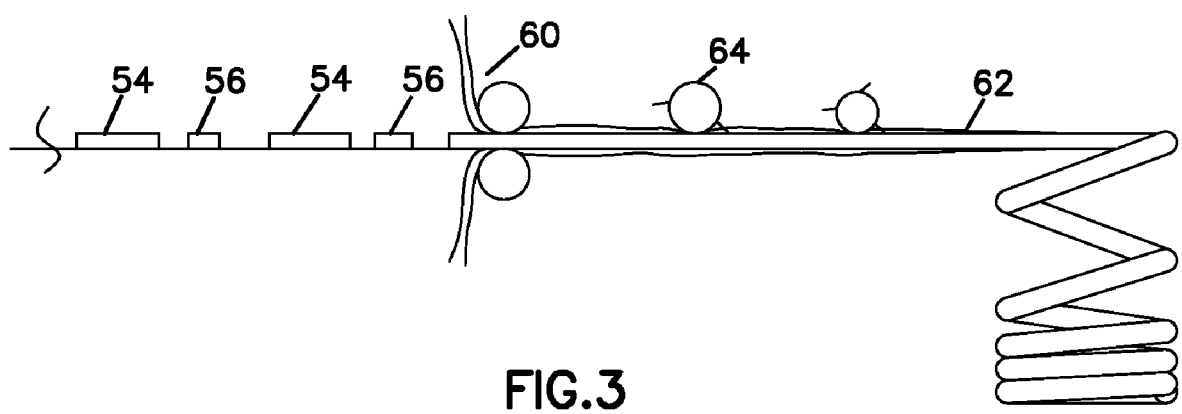
FIG. 3 is a diagrammatic illustration of a portion of the manufacturing of the identification tag of the RFID system of FIG. 2.
Figure 4:
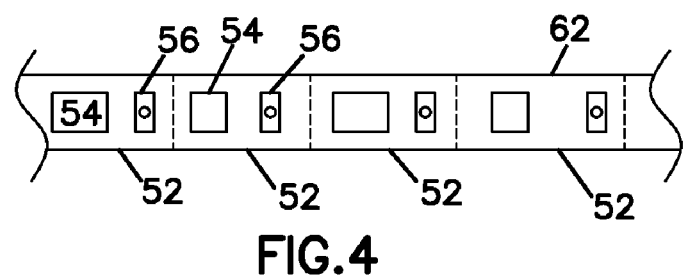
FIG. 4 is a diagrammatic illustration of a top view of a strip of identification tags of FIG. 3.
Figure 5:
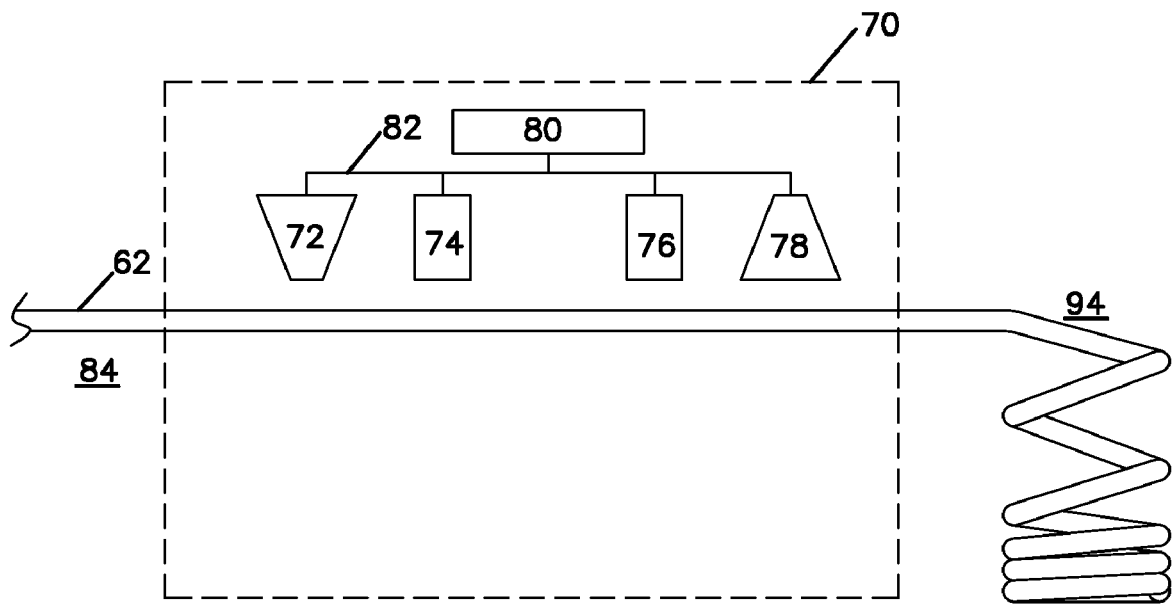
FIG. 5 is a diagrammatic illustration of the finishing process of the identification tag of the RFID system of FIG. 2.

Referring to FIGS. 3-5, a method for manufacturing the identification tag 52 is shown. The method may include the step of enclosing or encapsulating housings 54 within or as part of a flexible outer shell 59. As an example, nip rolling 60 or laminating flexible outer shell 59 around housings 54 including electronic components therein may be used to form a strip 62 of connected identification tags 52. It is anticipated that other processes or mechanisms may be used to encapsulate or enclose housings 54 to form strip 62 and tags 52 within the scope of the present disclosure and the examples provided above are merely illustrative. In the depicted embodiment reinforced material is also laminated within the outer shell 59. The depicted method further includes the step of perforating 64 the identification tags 52 so that they can be detached from each other by tearing the strip 62. The method may further include the step of punching a hole 58 in the identification tag 52 that is sized to receive a fastener for attaching the identification tag 52 to the ear of an animal. It should be understood that the method might include more or less steps. For example, in one embodiment the hole 58 is punched in the identification tag 52 by the tool used to attach the identification tag 52 to the animal's ear. In other embodiments the identification tags 52 are not perforated, but rather are cut with a pair of scissors before use. Furthermore, in the embodiment shown, the strip 62 is folded over itself for storage. However, it should be appreciated that the strip 62 could also be rolled over itself for storage.

Referring to FIG. 5, an apparatus and method for customizing and finishing the strip 62 of identification tags 52 is illustrated. In the depicted embodiment an identification tag processor 70 is shown to include an identification tag writer 72, a printer 74, an optical reader 76, a radio frequency reader 78, and a central processing unit 80 otherwise referred to as a controller. The above-identified devices of the tag processor 70 are shown hardwired together via wires 82. Nonetheless, it should be appreciated that the devices can be connected without wires such as via infrared signaling. In addition, it should be understood that identification tag processor 70 may include more or less devices than are shown in FIG. 5. For example, in some embodiments the optical reader 76 is omitted and the verification is done manually. In other embodiments the identification tag processor 70 includes additional devices such as a touch panel user interface. The functions of the individual devices identified above are addressed in further detail below.

Figure 6:
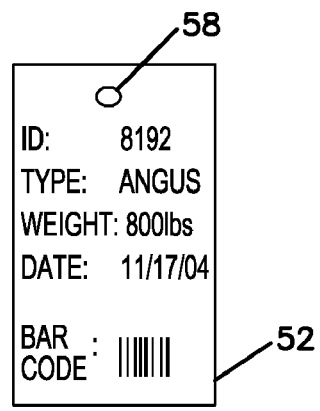
FIG. 6 is a front elevation view of an identification tag according to the principles of the present invention.
Figure 5A:
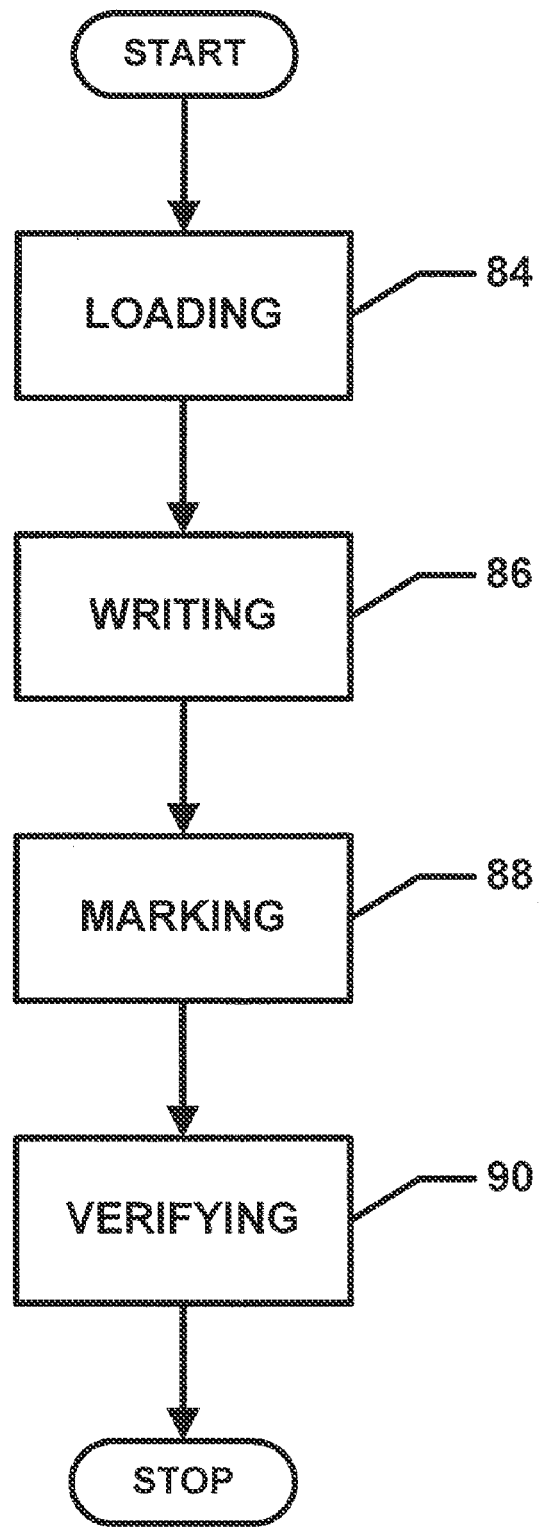
FIG. 5A is a flowchart showing an operational flow for customizing and finishing a strip of tags in accordance with the principles of the present disclosure.

The depicted method of customizing and finishing the strip 62 of tags 52 is shown in FIG. 5A. The method includes loading (operation 84) the strip 62 into the identification tag processor 70. The method can include writing (operation 86) such as with the tag writer 72 the identification number and other data defined by the end user to the memory of the identification tag 52. The method can include printing or otherwise marking (operation 88) the outer surface of the identification tags 52 with text, bar codes, etc, defined by the end user, such as with the printer 74. The identification tags 52 can include any number of different kinds of markings, which can be determined at the site of printing by the operator of the system. For example, in the embodiment of the identification tag 52 shown in FIG. 6, the identification tag 52 is marked with an ID number, the particular animal type, a bar code, and the weight of the animal at a particular date. The other data or marking can include, for example, the date and time that the tag is being printed or that the animal arrived at or departed from the facility.

Once the outer surface of the identification tag 52 is printed or otherwise marked 88, the outside marking can be verified (operation 90) by a device, such as the optical reader 76, that reads the markings and compares the read marking to the intended markings. Such devices may employ, for example, well known optical character recognition technology. Similarly, once the identification number or code is written to the inner electronic components of the identification tag 52, the writing of the identification number can be verified by a device, such as radio frequency reader 78, that reads the identification number and compares the read number with the number that was intended to be written. According to the above process, the tags are processed and the accuracy of the processing is checked. It should be understood that although the processing can be accomplished at one physical location as shown in FIG. 5, in alternative embodiments, the processing occurs in different physical locations and in a different order. On the other hand, in some embodiments, the optional laminating process shown in FIG. 3 is integrated with the finishing processes shown in FIG. 5 so that the identification tag can be generated completely on site.

It is anticipated that the tag writer 72 may be configured so that a producer or other user may be required to input each identification number in turn to enable the writing of that number to the memory and printing of the tags. Alternatively, tag writer 72, or an associated device connected via a network or any wired or wireless connection, may be pre-loaded or authorized to dispense a certain set of identification numbers. In an operation analogous to a refillable postage meter, a producer may request a set of identification numbers be assigned to the particular premises in anticipation of a need to tag and identify animals. In such an arrangement tag writer 72 could then dispense tags printed and coded with those pre-loaded numbers, improving efficiency of tagging operations that may be carried out chute-side at the producer's premises.

Data entry errors may be reduced as well, improving the accuracy of tracking of the tagged animals. When the producer has exhausted the set of numbers that have been assigned to the tag writer 72, the producer may request that a new set of numbers be approved so that the tag writer 72 can be "refilled."

In an embodiment of the current system the memory device in the transponder 34 can be written only once. In certain situations this type of system is preferred because it ensures that the identification numbers are not intentionally tampered with or accidentally changed once the card is created. On the other hand, it may be desirable that some data stored on the identification tag be erased and rewritten. In such embodiments, at least a portion of the memory location in the identification tags could be rewriteable and the tags may later be processed again through a similar device for updating the saved information. In these embodiments, the memory may be configured with a portion as write-once space for storage of the identification number and a portion as rewritable for storage of other information.

Schemes 1 and 2 below schematically describe additional embodiments of the tag, system, and methods of the present invention.

Figure 7:
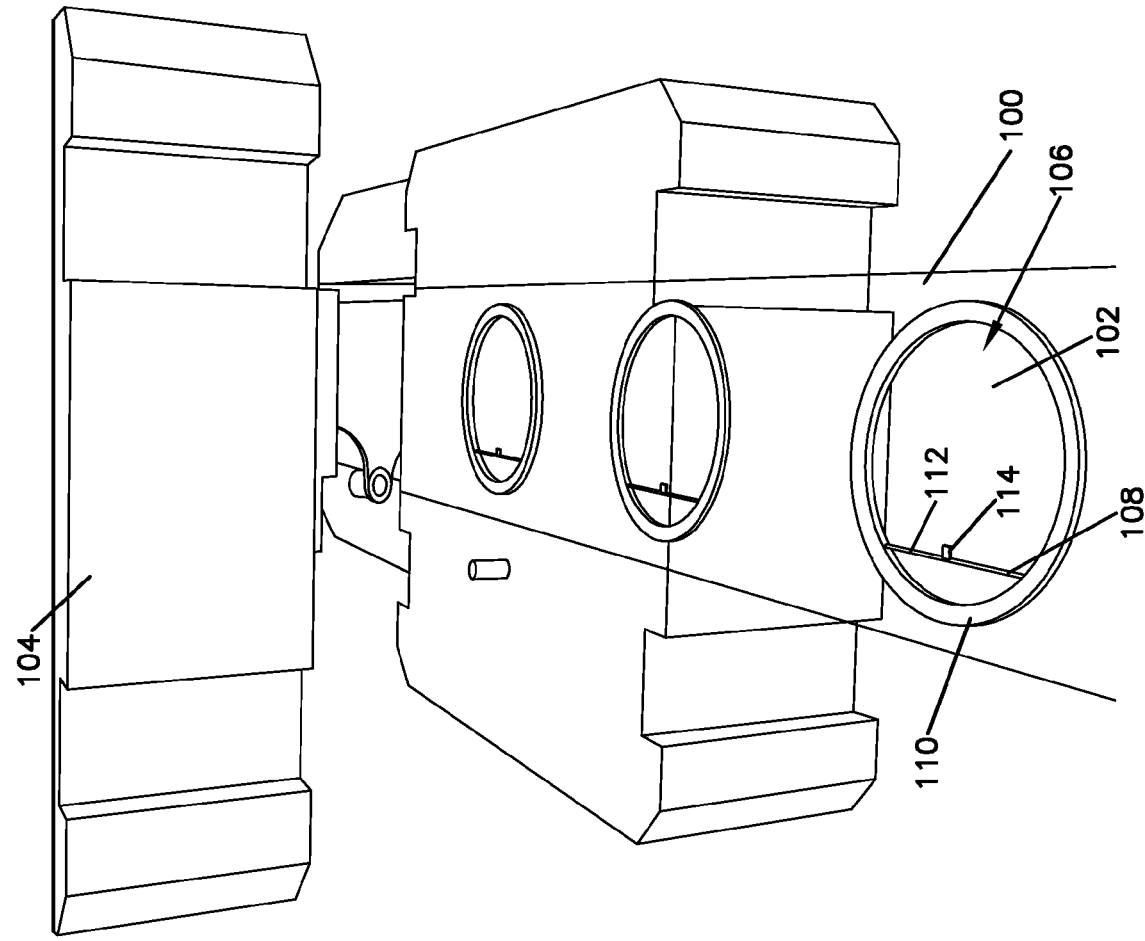
FIG. 7 is a schematic diagram of an alternative embodiment of a substrate on which identification tags according to the present invention may be formed.

A further embodiment of an identification tag according to the present invention may include a forming or molding process involving a strip substrate onto which are positioned various components of the tag. Such a strip substrate 100 is shown in FIG. 7. Substrate 100 includes a plurality of mounting locations 102 onto which are positioned the components of a tag in a desired order (which will be described further below). To begin forming a tag, substrate 100 is extended into a tag production device 104, which may be a single enclosed machine or which may be composed of a plurality of individual machines performing one or more but not all of the constituent processes.

A first mounting location 102 is positioned within device 104 so one or more wires or circuits 106 may be formed onto substrate 100. Circuits 106 may include a first lead 108, a coil 110, and a second lead 112. A chip 114 may be positioned and electrically connected to leads 108 and 112. Coil 110 is preferably composed of a plurality of windings of an electrically conductive wire, and may serve as both an induction coil and a transmission antenna, as described above. A secondary antenna may also be laid onto substrate 100 at location 102, such as within coil 110. Alternatively, coil 110 may serve as both high and low frequency transmission antenna, so that secondary antenna is not needed. As a further alternative, the secondary antenna could be located outside of coil 110 and still electrically connected to chip 114.

Figure 8:
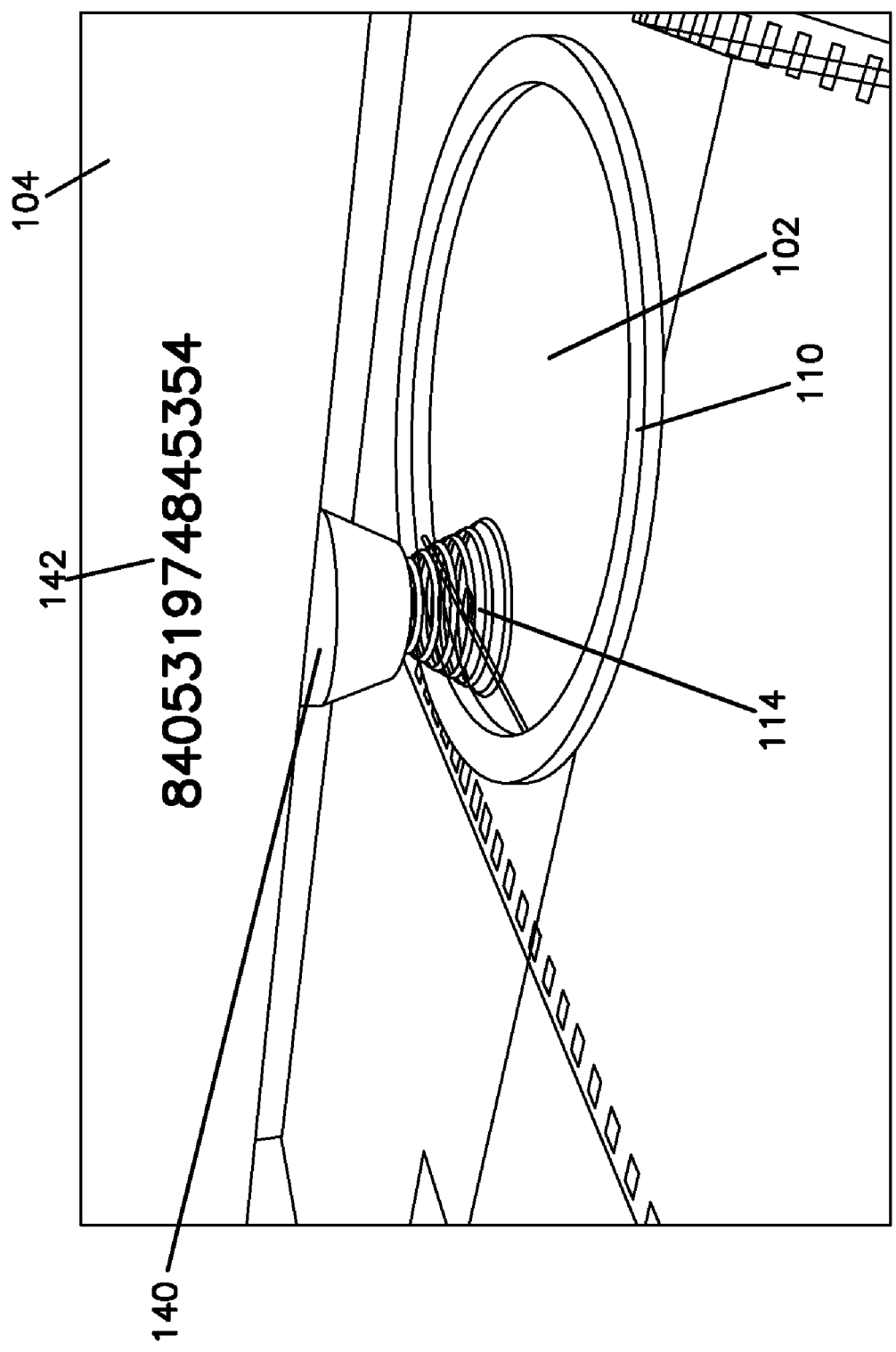
FIG. 8 is a schematic diagram of an encoding device for use with the identification tags of FIG. 7.

In an embodiment, once coil 110, leads 108 and 112, and chip 114 have been positioned on substrate 100 at a position 102, device 104 may include a data write head 140 to digitally encode a unique identifier 142 into chip 114, as shown in FIG. 8.

Figure 9:
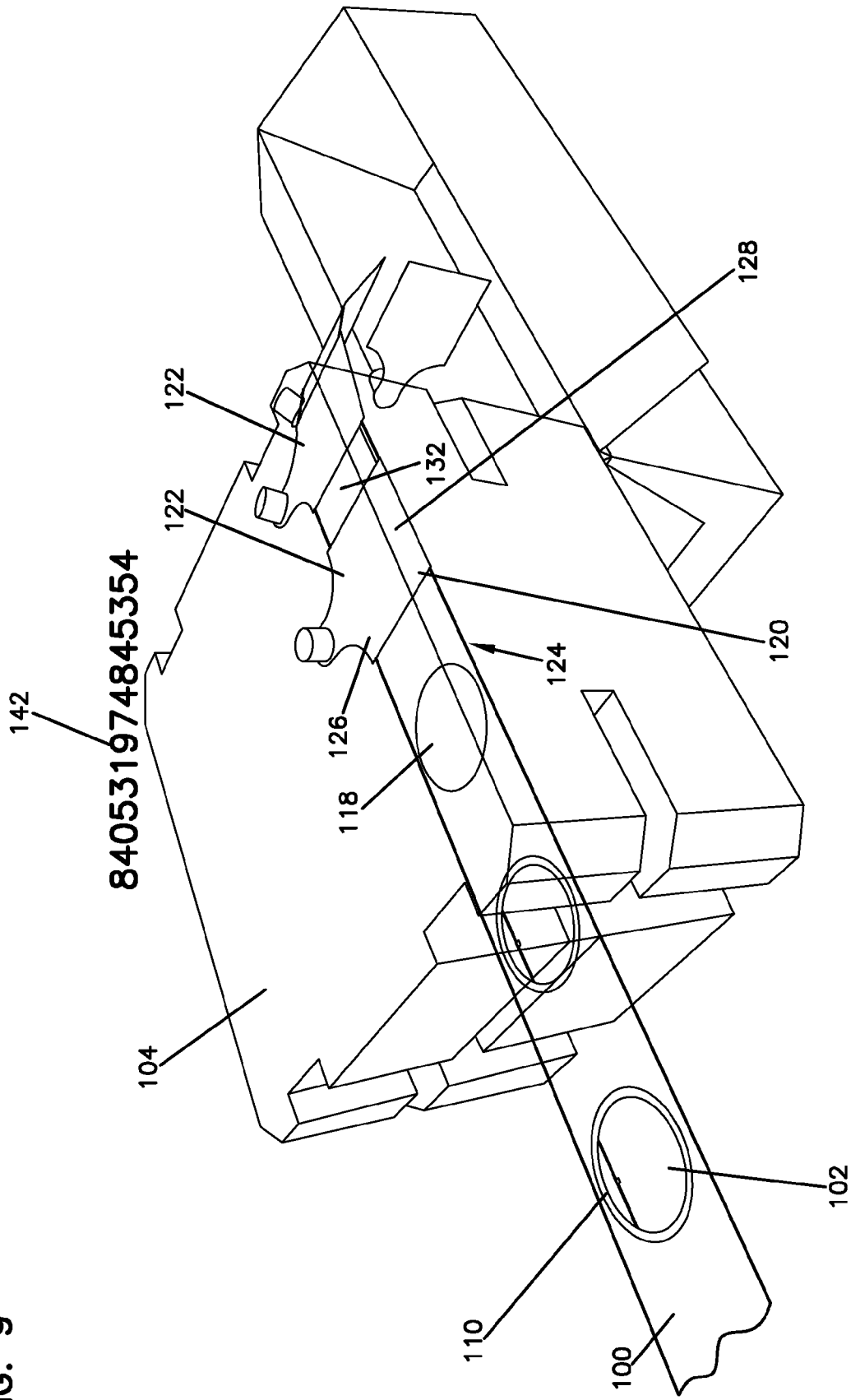
FIG. 9 is a schematic diagram of a forming device for forming identification tags upon the substrate of FIG. 7.

It is desirable that device 104 be configured to perform a dual mold operation, such as illustrated in FIG. 9. In a dual mold operation, a first molded material 118 is placed at location 102 about coil 110, chip 114, and leads 108 and 112. First molded material 118 is sized to encase the earlier placed components in a relatively less flexible and more durable material, which can help maintain the integrity of the components and the connections between the components. However, as it is desirable to have a flexible tag to attach to the animal to be identified, the entire tag is preferably not molded of this relatively less flexible material. In a second molding process within device 104, a second, more flexible molded material 120 is placed about and encases first molded material 118. Second material 120 preferably forms the finished size and shape of a tag 122.

Substrate 100 can be made of any of a variety of materials of sufficient strength and flexibility to provide a workable tag. Suitable materials include polyurethane, or similar flexible materials. It is anticipated that substrate 100 and tag 122 can include or be made of any of a wide variety of thermoactive materials. Numerous suitable thermoactive materials are commercially available.

Suitable thermoactive materials include thermoplastic, thermoset material, a resin and adhesive polymer, or the like. As used herein, the term "thermoplastic" refers to a plastic that can once hardened be melted and reset. As used herein, the term "thermoset" material refers to a material (e.g., plastic) that once hardened cannot readily be melted and reset. As used herein, the phrase "resin and adhesive polymer" refers to more reactive or more highly polar polymers than thermoplastic and thermoset materials.

Suitable thermoplastics include polyamide, polyolefin (e.g., polyethylene, polypropylene, poly(ethylene-copropylene), poly(ethylene-coalphaolefin), polybutene, polyvinyl chloride, acrylate, acetate, and the like), polystyrenes (e.g., polystyrene homopolymers, polystyrene copolymers, polystyrene terpolymers, and styrene acrylonitrile (SAN) polymers), polysulfone, halogenated polymers (e.g., polyvinyl chloride, polyvinylidene chloride, polycarbonate, or the like, copolymers and mixtures of these materials, and the like. Suitable vinyl polymers include those produced by homopolymerization, copolymerization, terpolymerization, and like methods. Suitable homopolymers include polyolefins such as polyethylene, polypropylene, poly-1-butene, etc., polyvinylchloride, polyacrylate, substituted polyacrylate, polymethacrylate, polymethylmethacrylate, copolymers and mixtures of these materials, and the like. Suitable copolymers of alpha-olefins include ethylene-propylene copolymers, ethylene-hexylene copolymers, ethylene-methacrylate copolymers, ethylene-methacrylate copolymers, copolymers and mixtures of these materials, and the like. In certain embodiments, suitable thermoplastics include polypropylene (PP), polyethylene (PE), and polyvinyl chloride (PVC), copolymers and mixtures of these materials, and the like. In certain embodiments, suitable thermoplastics include polyethylene, polypropylene, polyvinyl chloride (PVC), low density polyethylene (LDPE), copoly-ethylene-vinyl acetate, copolymers and mixtures of these materials, and the like.

Suitable thermoset materials include epoxy materials, melamine materials, copolymers and mixtures of these materials, and the like. In certain embodiments, suitable thermoset materials include epoxy materials and melamine materials. In certain embodiments, suitable thermoset materials include epichlorohydrin, bisphenol A, diglycidyl ether of 1,4-butanediol, diglycidyl ether of neopentyl glycol, diglycidyl ether of cyclohexanedimethanol, aliphatic; aromatic amine hardening agents, such as triethylenetetraamine, ethylenediamine, N-cocoalkyltrimethylenediamine, isophoronediamine, diethyltoluenediamine, tris(dimethylaminomethylphe-nol); carboxylic acid anhydrides such as methyltetrahydrophthalic anhydride, hexahydrophthalic anhydride, maleic anhydride, polyazelaic polyanhydride and phthalic anhydride, mixtures of these materials, and the like.

Suitable resin and adhesive polymer materials include resins such as condensation polymeric materials, vinyl polymeric materials, and alloys thereof. Suitable resin and adhesive polymer materials include polyesters (e.g., polyethylene terephthalate, polybutylene terephthalate, and the like), methyl diisocyanate (urethane or MDI), organic isocyanide, aromatic isocyanide, phenolic polymers, urea based polymers, copolymers and mixtures of these materials, and the like. Suitable resin materials include acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials, polycarbonate materials, chlorinated polyether resins, polyethersulfone resins, polyphenylene oxide resins, polysulfone resins, polyimide resins, thermoplastic urethane elastomers, copolymers and mixtures of these materials, and the like. In certain embodiments, suitable resin and adhesive polymer materials include polyester, methyl diisocyanate (urethane or MDI), phenolic polymers, urea based polymers, and the like.

Suitable thermoactive materials include polymers derived from renewable resources, such as polymers including polylactic acid (PLA) and a class of polymers known as polyhydroxyalkanoates (PHA). PHA polymers include polyhydroxybutyrates (PHB), polyhydroxyvalerates (PHV), and polyhydroxybutyrate-hydroxyvalerate copolymers (PHBV), polycaprolactone (PCL) (i.e. TONE), polyesteramides (i.e. BAK), a modified polyethylene terephthalate (PET) (i.e. BIOMAX), and "aliphatic-aromatic" copolymers (i.e. ECOFLEX and EASTAR BIO), mixtures of these materials and the like.

Whatever material is used for substrate 100, the material should be compatible with first and second molded materials 118 and 120. This will ensure good adhesion of the material once they are molded together to form tag 122. It may be preferable to have substrate 100 and molded materials 118 and 120 be made from different forms, durometer or hardness of the same base material, such as polyurethane. Such a common material base for all three components may help to improve bonding of the materials of tag 122. Another approach to improving bonding or adhesion between the materials may be to mold second material 120 about first material 118 while first material 118 is still green, meaning that it has not fully cooled or cured. These approaches to improve bonding or adhesion may be applied separately in the formation of tag 122 or may be combined.

As described above, tag 122 may be printed upon in a later process with various unique identification numbers and other unique visual attributes. However, such printed markings may be susceptible to damage if they are surface markings only. Device 104 may be configured to mold in a unique identification number in an exterior surface of second material 120. Such a molded in marking 126 is less susceptible to destruction during movement of a tagged animal. Such a molding-in process within device 104 may be carried out with a mold imprint that is automatically indexed for each tag 122 produced along substrate 100, so that each tag 122 has a unique identifier compared to the other tags of the substrate. If sets of numbers are provided by an appropriate government agency, the molded in numbers can be made to correspond to or match the government issued numbers. Tag 122 may also include an area 128 for adding a local or management identifier separate from the government issued identifier.

As an alternative, or in addition, to the identifier molding process described above, device 104 may also include an inkjet printer head, a laser printer head, or some form of a sublimation printer head. These different printer heads within device 104 would provide for different levels of permanence and durability of markings as compared with the molding process. The print head can be employed to print, for example, the date and time that the tag is being printed or that the animal arrived at or departed from the facility. It is also anticipated that different in-mold decorating processes may be used to mark tag 122 with unique government identifier 142. Also, other methods may be used to provide additional security for the authenticity of tag 122, such as heat stamping holograms or similar features into tag 122 during the placement of second material 120 within the mold.

In-mold marking or labeling may be incorporated with the present disclosure to provide an alternative approach to forming tags 122 with distinct visual appearances. Such in-mold marking may include the insertion of a pre-printed mold-sized substrate within the mold and adhered to an inner surface of the mold. When second material 120 is injected into the mold, the pre-printed substrate and second material 120 would fuse or bond, durably attaching marking to the exterior of tag 122 during the molding process. As alternative, substrate 100 may be used to incorporate a pre-printed exterior marking, for example, on a reverse side opposite where the antenna is formed, and device 104 configured to ensure that this reverse side of substrate 100 is part of an outer surface of tag 122.

Depending on the requirements of the particular application, device 104 may provide tags 122 with unique government identifier 142 and one or more local indicia, such as color coding, or larger printed identifiers such as, but not limited to local or management numbers 146. Such a combination of government issued identifier 142 and local management number 146 would permit tag 122 to fulfill both higher level tracking and long term functions along with shorter term local functions, such as tracking an animal in a feedlot or an auction facility. The local indicia can include, for example, the date and time that the tag is being printed or that the animal arrived at or departed from the facility.

As described above, tag 122 is shown with a single chip 114 mounted to substrate 100. In this embodiment, chip 114 is capable of handling both high and low frequency transmission. It is also anticipated that two separate chips may be mounted within each tag 122. One of the chips may manage receipt of power induced by an external signal received through coil 110 and then the transmission of one of the two transmission frequencies. The first chip would also pass some of the induced energy from coil 110 to the second chip. The second chip may then transmit on the second frequency. It may be desirable to use two separate chips to reduce overall cost of production or to improve efficiency of the transmission or reception functions of tag 122. Alternatively, using two chips may enable more flexibility in the use of alternative embodiments of tags, as will be described below.

Figure 10:
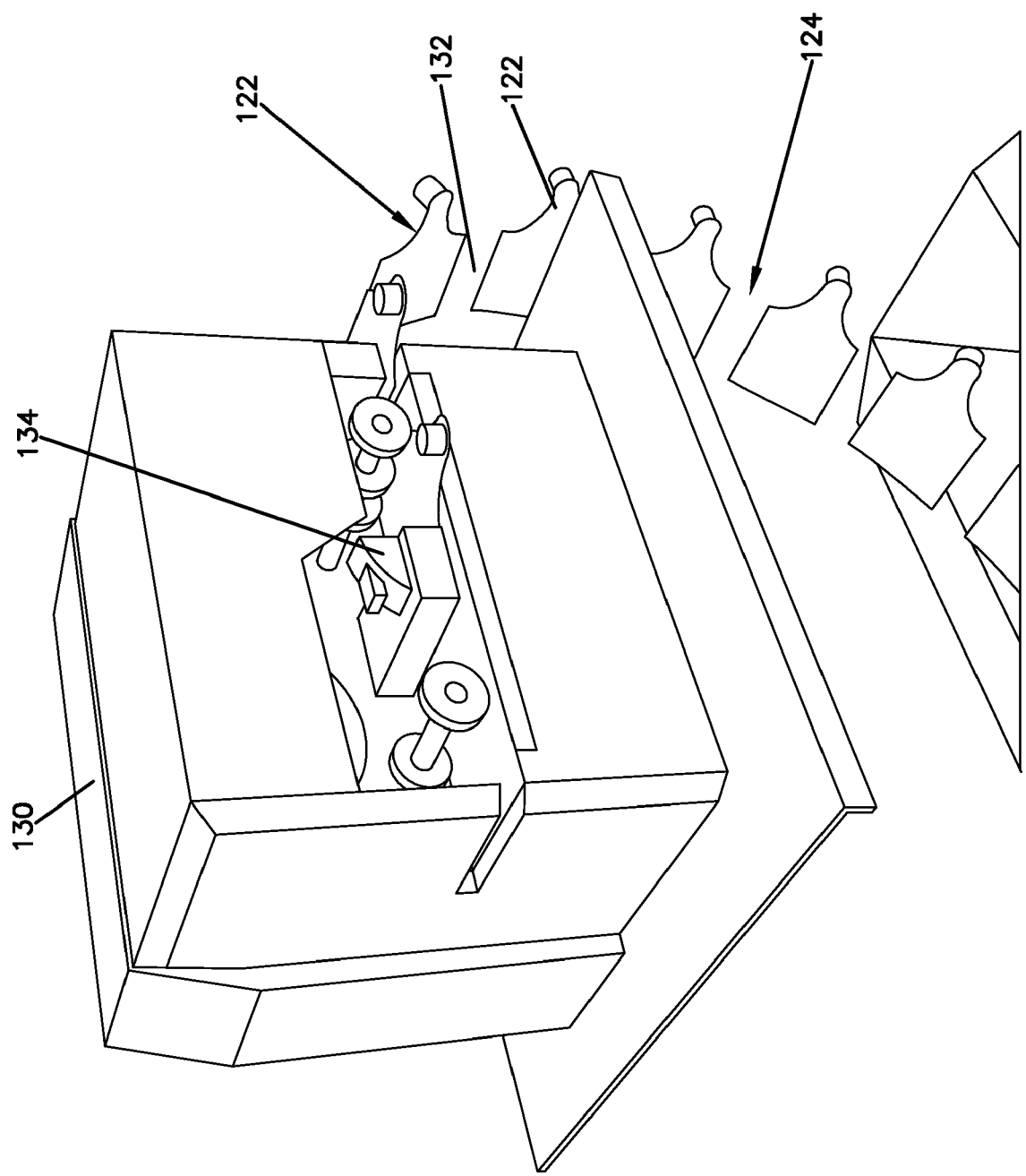
FIG. 10 is a perspective view of a printing device for printing onto the identification tags of FIG. 7.

As shown in FIG. 10, a string of tags 122 formed on substrate 100 is maintained in a continuous strip 124, which may be fanfolded, rolled or otherwise packaged for sending to a producer, an auction lot, or other location within the animal production process. In an embodiment, tags 122 in strip 124 are inserted within a printing and encoding device 130 that may be positioned chute or corral side for ease of operation. Each of the tags 122 is pre-molded and encoded with a government issued identifier. Each of the tags 122 also includes area 128 for printing, embossing or otherwise marking with a local or management identifier. Area 128 allows a printing head 134 of chute side printer and encoder 130 to be used to apply a specific marking immediately prior to tag 122 being attached to the animal. While a novel printer/encoder embodiment 130 is described and shown herein, it is anticipated that tags 122 and strip 124 may be used with conventional printers currently in use for printing characters or symbols within area 128.

Figure 11:
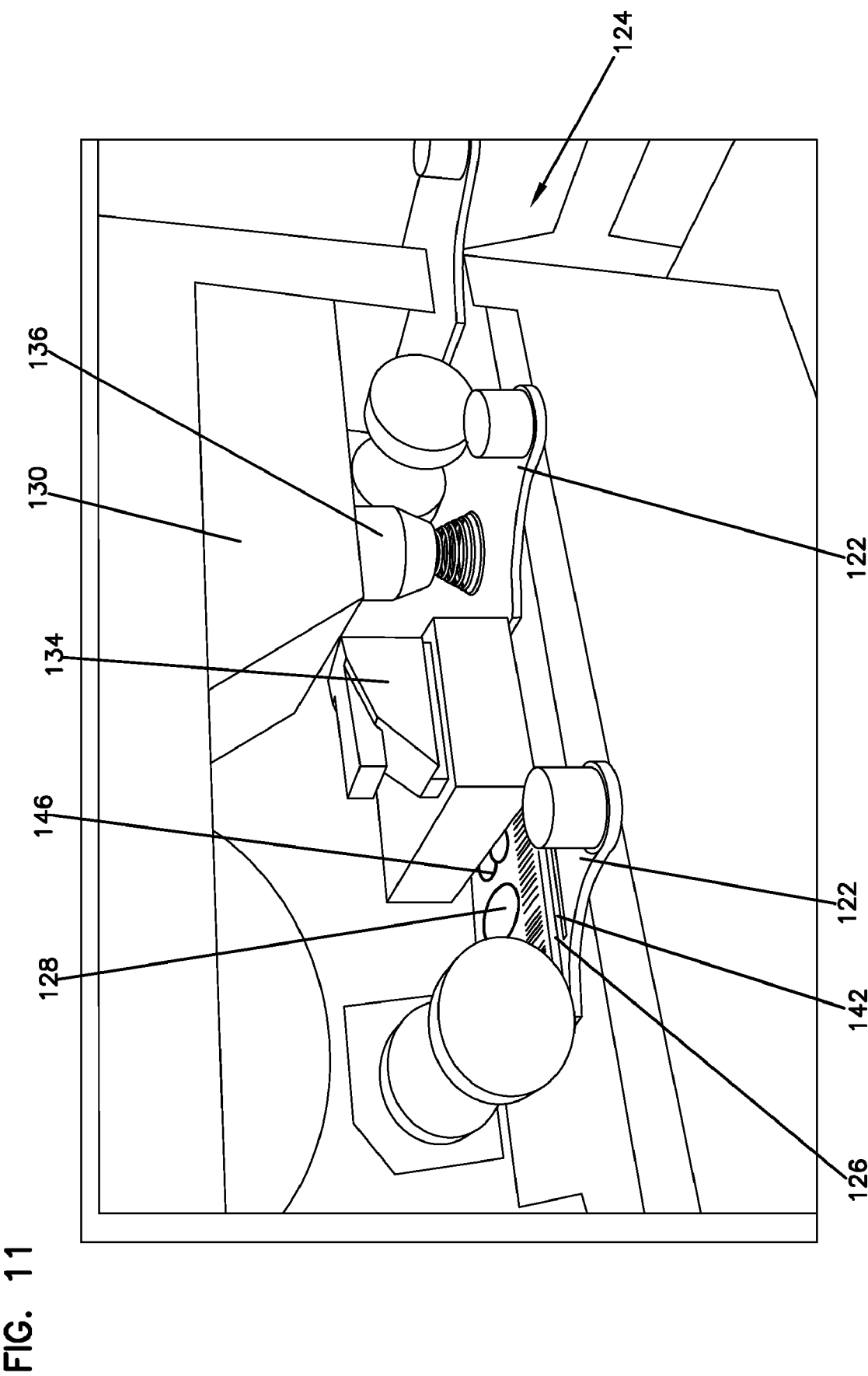
FIG. 11 is a perspective view of a second embodiment of a printing device for printing onto the identification tags of FIG. 7.
Figure 12:
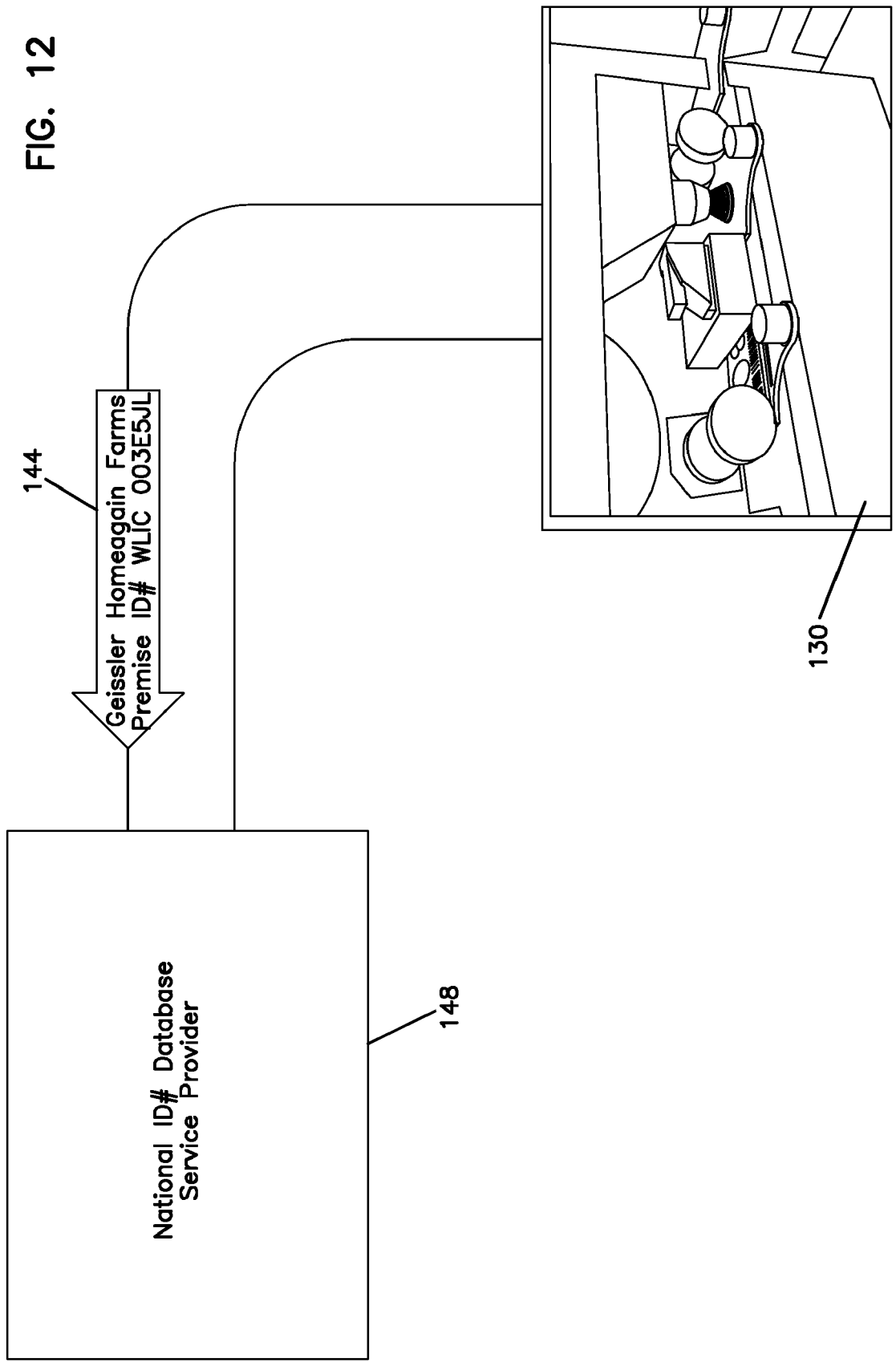
FIG. 12 is a representation of communication between the printing device of FIG. 11 and a remote database.

As shown in FIG. 11, chute side printer and encoder 130 may also include an encoding head 136 to place additional digital information on chip 114 that will be transmitted at the higher frequency when tag 122 is queried with an appropriate signal. As shown also in FIG. 12, such additional information 144 could include identifiers of the producer premises, relevant dates, local control numbers or other elements. As shown in FIG. 12, chute side printer and encoder 130 may also upload certain information to a national database 148 to associate a particular government identifier 142 with particular additional information 144.

By having tags 122 maintained in a strip 124, printer 130 may advance tags 122 automatically without requiring a user to manually insert tags. After each tag 122 is printed with a local management number 146 in print area 128, a web 132 between each tag 122 may be severed by a final operation of printer 130, and a user may retrieve the tag for attaching to the animal. Having tags 122 in a specific order along strip 124 ensures that a known sequence of government identifiers may be assigned to animals.

Figure 13:
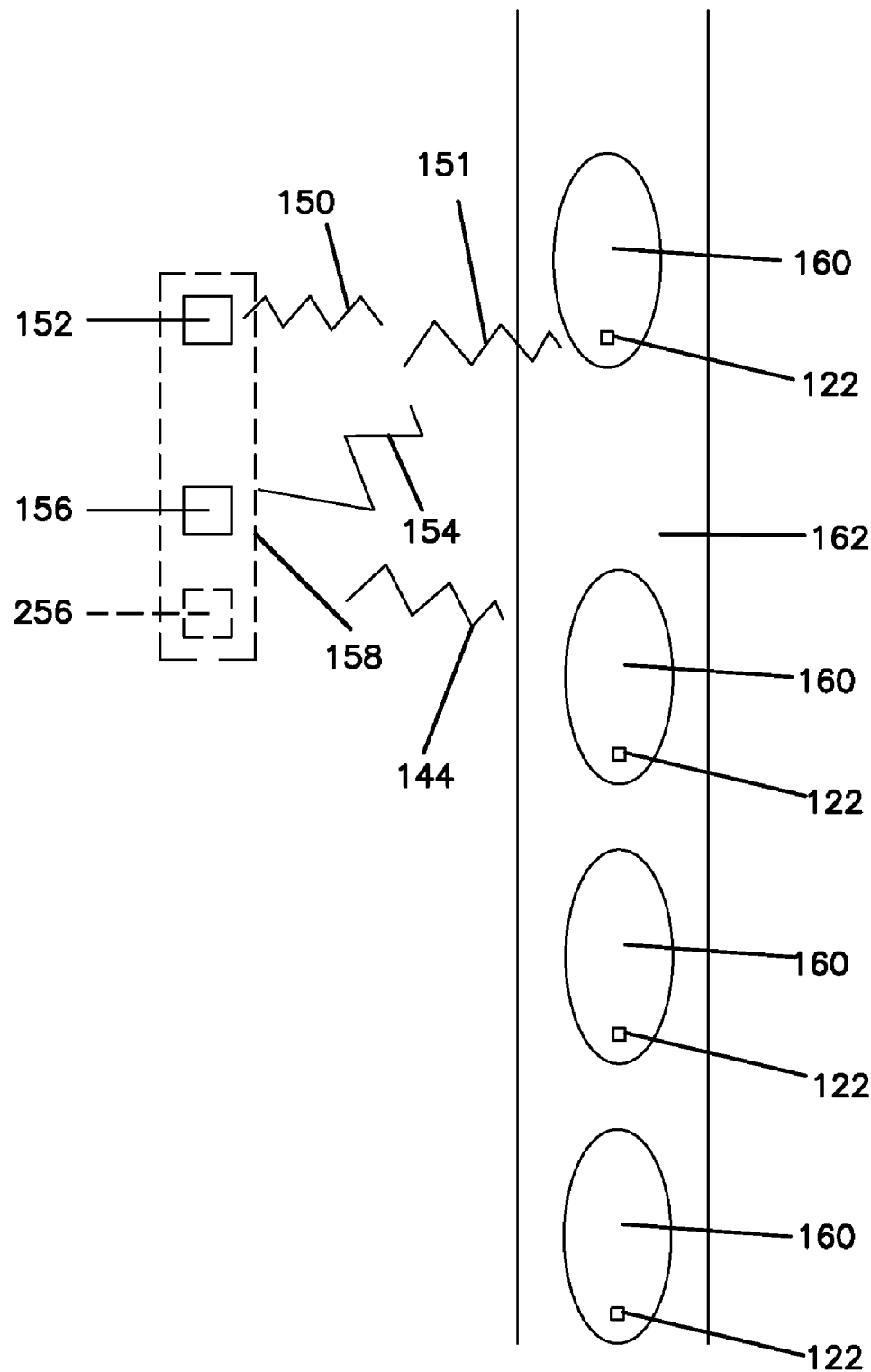
FIG. 13 is a schematic diagram of animals tagged with an identification tag moving through a chute adjacent a transceiver.

As described above, one of the unique features of tag 122 is the inclusion of two distinct transmission frequencies. In addition, these two frequencies may be provided to communicate different sets of data and they may function at different ranges or proximities to a transceiver keyed to induce power into coil 110. Differences in frequency may also be configured to provide different depths of penetration as balanced with signal or data density or transmission speed. A lower frequency signal, such as query signal 150 and reply signal 151 will be able to penetrate through relatively more material but will have relatively shorter range of transmission to an external transceiver 152, as shown in FIG. 13. Such a lower frequency signal will also be able to transmit relatively less data over time. A higher frequency signal 154 will provide a greater transmission distance if the range is unobstructed, though signal 154 will not be able to penetrate an obstruction as well as signals 150, 151. Further, signal 154 will be able to transmit a greater amount of data over the same amount of time to a receiver 156, as compared to signal 151.

However, since there is growing acceptance of a standard, or ISO frequency for use with agricultural animals, such as cattle, at least one of the frequencies transmitted by tag 122 preferably conforms to the standard. The second, or any additional frequencies may be configured as desired by a user or producer to accomplish other herd management or sales tasks. For example, a producer may desire to have ear tags on cattle which transmit a government issued identification number to a standard transceiver and also transmit more specific information such as date of birth, or more specific herd information, to specialized receiver. The government identifier is likely a required item that must be transmitted by tag 122, while the remaining data items are for specific herd or sales functions.

In the previous examples of printing and encoding of tags, described above, the tag was printed and encoded with all data and identifiers directly at chute side or in a single process. This alternative embodiment may involve two processes, one process for the creation of strip 124 of tags 122, each pre-encoded with a government identifier and indelibly marked with the identifier, and the other process for the printing and encoding local management data and identifiers. It is anticipated that the first process may be performed in a high efficiency and secure setting, which may be centralized and serve a plurality of producers and auction lots. The second process may take place at a user location, such as chute side at an auction yard or at a producer's premises.

By having coil 110 optimized for use with a standardized ISO frequency, which is typically approximately 134.2 kHz, the induction coil can be used to provide power to both of the high and low speed transmission circuits. Current tags are generally arranged to receive a signal with coil 110 at the same frequency that they transmit through coil 110. Tag 122 is configured so that power is induced within coil 110 and energizes both transmit circuits at the same time. Thus, the higher frequency transmit capability of tag 122 does not require a separate coil 110 and the high frequency receiver receiving the higher frequency data signal from tag 122 does not require a transmitter. Alternatively, transceiver 152 may include receiver 156 within an integral housing such as housing 158, so that a single unit may receive both the low and high frequency signals 150, 151, and 154.

Another advantage to using two different frequencies for transmitting data from tag 122 is that it allows more information to be gathered from animals 160 that may be moving quickly, for example, along a passageway or chute 162 between pens or other holding enclosures. With the lower frequency signals 150, 151, the animal may be within range of transceiver 152 for only a short time, allowing only the simple government identifier to be transmitted and received, before the animal has moved out of range. The paired use of higher frequency signal 154, with a proportionally longer range and a greater transmission speed, may provide a longer dwell time of the animal within the range of receiver 156 and provide for the transmission of more detailed data during this dwell time. Both of these frequencies, with their different ranges and transmission speed, are examples of near-field communications approaches and some of the trade-offs that may exist with such approaches. The pairing of complementary near-field communications systems within a single tag 122 provides for a balancing of the tradeoffs without sacrificing conformance with a required standard or speed and density of data transmission.

As shown in FIG. 13, more than one animal 160 may be within range of either or both transceiver 152 and receiver 156 simultaneously. They may be within chute 162, a holding pen or corral, or some other enclosure. When this occurs, a plurality of tags 122 may be trying to respond to query signal 150, so that a plurality of signals 151 and 154 may be transmitted at the same time. In such a situation, some form of anti-collision mechanism is desirable to reduce conflicts or collisions among the plurality of signals 151 and 154 being transmitted by the plurality of tags 122 so that each of the signals 151 and 154 can be captured by transceiver 152. One embodiment of an anti-collision approach may be to include a switch in the higher frequency transmission portions of circuitry 106 of tags 122 and to configure a second transceiver 256 in place of receiver 156. Such a switch, preferably included on chip 114, would permit transceiver 256 to signal to each tag in turn when it has received the additional information 144 from that particular tag 122. When a tag 122 receives this acknowledgement signal from second transceiver 256, the tag 122 would cease to transmit its additional information 144. This will permit transceiver to in turn receive and acknowledge the receipt of the additional information 144 from each tag 122 in turn, until all the tags 122 within range of transceiver 256 have ceased to transmit high frequency signals.

Such anti-collision technology could also be applied to the lower frequency transmission by tags 122 but is less likely to be needed, due to the shorter range of the lower frequency transmissions. In addition, it may be desirable to ensure that tag 122 always transmits its government identifier when polled by transceiver 152.

As shown in the earlier FIGS., different antennas for each of the different frequencies may be provided within tag 122. One of the transmission antennas is shown as the same coil 110 that receives an induction and polling signal to trigger transmission by tag 122. It is anticipated that tag 122 may include a single transmission antenna that serves both frequencies, with coil 110 serving only as a receiving antenna. Also, the antennas shown have a generally planar layout, lying generally parallel with tag 122. Such an antenna layout transmits most efficiently in a direction perpendicular to the plane of tag 122. However, it is difficult to ensure that tag 122 will be optimally positioned by the marked animal to place the tag in the desired plane. It is anticipated that one or both transmission antennas may be configured to be more omni-directional, and thus may provide a stronger signal in one or both frequencies along a broader range of directions.

It is further anticipated that tag 122 may include a powered or semi-powered transmitter with an on-board power source, as compared to the transmitters described above which receive induced power from transceiver 152 via coil 110. Such an alternative embodiment might still be triggered to transmit stored data through a signal from transceiver 152, but the on-board power supply might provide for higher signal strength or length of transmission than might be possible with the induced power embodiment shown above. By semi-powered, it is intended to mean that the tag would still receive some power via induction through coil 110 but that more power than that induced might be available for transmission.

There are a variety of combinations of fully- and semi-powered transmission capabilities that may be included within the present invention. It is anticipated that the two or more transmission circuits included on tag 122 could transmit in distinctly different fashions, in response to a query signal. One of the transmission circuits could respond by transmitting continuously for a fixed period of time, or until the level of power available in a capacitor connected to the circuit dropped below a specified level. One of the transmission circuits might transmit data only a specified number of times (for example 1 to 3 times) in a burst mode only in direct response to a query signal. This burst mode could be a higher power transmission that draws power from an on-board capacitor or battery. Such a high power transmission could only be supported for a limited number of operations before draining the power supply so it is likely that the number of bursts performed in response to a query signal would be smaller. It is also anticipated that an on-board capacitor may provide a more persistent storage of at least a partial charge, rather than discharging entirely during transmission. If tag 122 only transmits for a specified period of time when exposed to a query signal, any remaining charge within the capacitor could be conserved to support future transmissions. In addition, if tag 122 remains within range of the query signal after completing the specified length of transmission, exposure to the query signal could also induce current to provide additional charge to the capacitor.

A higher power transmission in response to a query mode could be also be accomplished on a periodic basis when tag 122 is continuously within range of a query signal. Since the query signal may be used to induce an electric current in tag 122 to power operation, if tag 122 is continuously in range of such a signal, the induced current could be directed to a capacitor. When the capacitor has reached a certain level of charge, the burst mode of transmission could be enabled. Similarly, an on-board battery could be used to provide a periodic burst transmission but interval may be based on a clock cycle rather than a capacitor charge level. For example, while within range of the query signal, tag 122 may transmit data in burst mode every ten minutes, or some other pre-specified interval.

In conjunction with the collision avoidance approach described above, an on-board capacitor on tag 122 may be charged by inductance by the query signal, even if tag 122 has been instructed to not transmit all or part of its data. It is also anticipated that an on-board battery and an on-board capacitor may be used in conjunction with one another. In such an example, the capacitor would receive some induced current from the query signal, which would trigger transmission of data on the multiple frequencies of tag 122. While the charge within the capacitor may be sufficient to permit transmission, the battery may be used to enhance the power of the signal transmitted on one or more of the frequencies. Such a pairing of capacitor and battery may extend the life of the battery by only tapping it for supplemental power to augment the power provided by the capacitor. Such a pairing of power sources for tag 122 could provide for enhanced range of data transmission and may also permit tag 122 to transmit a greater volume of data.

Such added capacity for transmission data may be utilized by incorporating one or more biosensor devices, such as a core body or blood temperature sensor, located elsewhere on the animal to which tag 122 is attached. It is anticipated that these biosensors could be incorporated into a local data bus for the animal and that tag 122 could serve as a storage device or a retransmission device for data collected and signaled by the biosensors. In such an arrangement, the biosensors would have low level communication capabilities that would be sufficient strong to transmit data to tag 122, which might be attached, for example, to an ear of the animal. Tag 122 would then retain some amount of information, such as the most recent data from the biosensors, and then transmit this data in response to a query signal. The power required to transmit this additional data received from the biosensors and held by tag 122 may make the additional transmission capacity provided by including a persistent on-board power supply. Such a persistent power supply could be an on-board battery or a capacitor which maintains some residual charge after transmission and which may recharge itself with induced current from a query signal between transmissions.

It is also anticipated that the above dual process creation of animal identification tags may be adapted to non-electronic identifier tags. As an example, it is known to provide animals with temporary back tags once they arrive at an auction lot from a producer facility. These back tags include basic identification of the animals and their source during and immediately after the auction but are not intended to be permanently attached to the animal. Such tags may still be created with a government issued identifier at a central facility and shipped to the auction lot for chute side printing with the desired local identifiers and source information that are necessary for the sale to proceed. Such tags might only last for a week or so, but this may be sufficient time for an animal to pass from a producer through an auction lot, to a buyer, who immediately processes the animal. The government identifier would accompany the animal during these transitional steps between the various parties and be available to the processor to ensure that a source identifier remains with the animal. While not having the benefit of the remote query and transmission capabilities described above, this temporary tagging production process may satisfy regulatory requirements for identification of source throughout the transfer and processing functions.

Similarly, it is anticipated that an alternative embodiment of tag 122 may be constructed without the electronics for receiving or transmitting signals. This alternative non-electronic tag could still be created in a continuous strip upon substrate 100 and pre-printed with a unique government identifier through a variety of in-mold or post molding labeling techniques described above. The tag could then be transported chute-side, where a local identifier and/or additional information regarding the animal, such as source, date of birth, etc, may be printed on the tag before it is affixed to the animal.

It is also anticipated that back tags may be formed according to the present invention which incorporate one or more of the signaling features described above. Such RFID back tags may be configured similarly to tag 122 or other tags described above, and include antenna(s) and circuitry for receiving a signal at a first frequency, and responding with a signal at one or more frequencies. Such RFID back tags would not need to be encapsulated in a durable outer layer, such as second material 120, as the back tags are not intended to be present on the animal or object marked for an extended period of time. It may be desirable to have these back tags include first material 118 as a more durable, more rigid layer than current back tags, to provide some degree of integrity protection for the antenna and circuitry as the tag is attached to the back of an animal and the animal wanders about a corral or pen at a sales or holding facility. The antenna and signal circuitry could be mounted to substrate 100 and then overmolded with first material 118, as described above. The combination can be marked in-mold or printed on post molding to provide the external markings described above. This external printing may be accomplished wholly or in part at chute-side. As described above, these RFID back tags may be encoded wholly or in part at chute-side as well.

Figure 14:
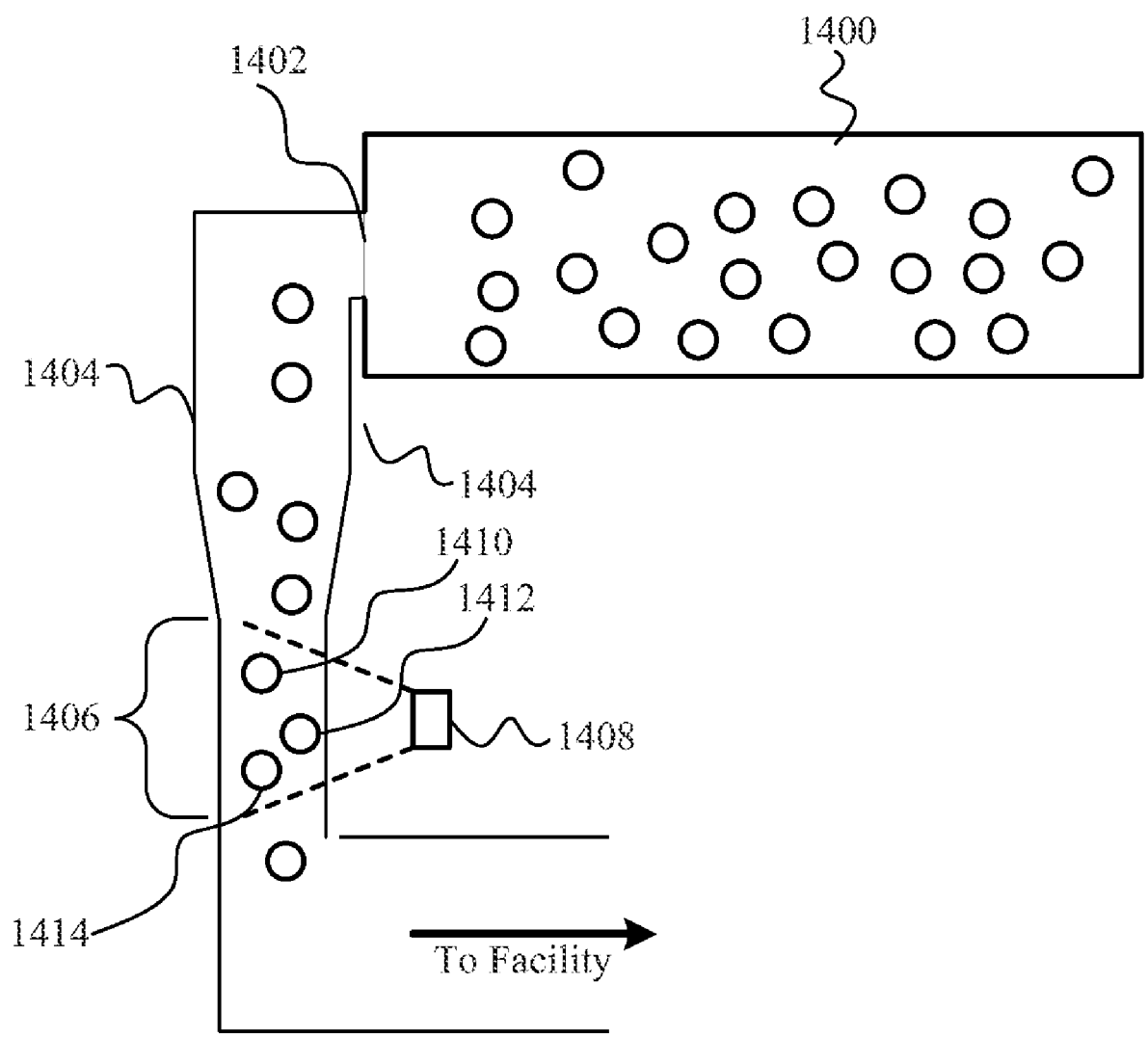
FIG. 14 is a depiction of a transport vehicle unloading animals for entry into a facility.

FIG. 14 depicts a transport vehicle 1400 carrying a plurality of animals (represented as circle, some of which are individually called out with reference numerals) to a facility. The animals depart from the transport vehicle through a door 1402, and are guided by fencing 1404 to the facility (not depicted).

At the facility, the animals (e.g., cattle) may be held in various holding areas. (The animals are referred to below as cattle for the sake of illustration. It is to be understood that the animals may be of any species.) Depending upon the transaction to be carried out at the facility, the cattle may be segregated by ownership, size, anticipated size at some point in the future, etc. Thus, for example, one holding area may contain cattle owned by one owner, while another holding area contains cattle owned by another owner. Alternatively, one holding area may contain cattle of a particular size or projected size, while another holding area may hold cattle of another size or projected size. In any event, the cattle are put into various holding areas at the facility based upon a segregation criterion.

En route to the facility, the cattle pass through a communication zone 1406. The communication zone 1406 is an area in which an RFID tag attached to a steer or heifer receives a query (i.e., a transmission of electromagnetic radiation at a given frequency or frequencies) transmitted from a base station 1408, as described above with reference to FIGS. 1-13. Outside of the communication zone 1406, an RFID tag is out of range of the base station 1408, meaning that the RFID tag does not receive a query from the base station 1408, and does not attempt to generate a return transmission. In FIG. 14, the communication zone 1406 is depicted as being at a point removed from the truck. Of course, the communication zone 1406 may be located at any desired point, including in the transport vehicle itself, at the door of the transport vehicle, or at the entry of the facility, for example.

As a steer or heifer passes through the communication zone 1406, the RFID tag associated with the animal receives a query from the base station 1408. In response, the RFID tag replies with a communication frame. As described previously, the communication frame may include a unique number, which identifies the animal. In addition, or as an alternative, the communication frame may include the segregation criterion used to sort the various animals into the various holding areas within the facility. (Of course, other information may be stored in an RFID tag, and may be included in the communication frame, as described previously.) Thus, as a given steer or heifer passes through the communication zone 1406, its identity and sorting criterion may be known to the personnel operating the facility. For example, the information transmitted from a given RFID tag to the base station 1408 may be presented upon a display, so that the personnel can view the display as the animal passes through the communication zone 1406, and can thereby determine to which holding area the animal should be lead.

Observation of FIG. 14 reveals some challenges. The underlying premise of the aforementioned scheme is that when the identification information/sorting criterion is presented on the display, the personnel operating the facility will be able to determine the particular animal to which the information corresponds (i.e., they mentally ask themselves "which animal just walked through the communication zone?"). As previously noted, the communication zone 1408 is finite, and the cattle may pass through the zone 1406 quickly. Thus, it is possible that the return transmission may not be fully processed and presented on the display until the animal has already exited the communication zone 1406, and progressed toward the facility. Such an eventuality is troublesome, because confusion may arise regarding the identity of a particular animal corresponding to the information presented on the display. For example, the animal may mingle with other animals, creating confusion regarding which animal had just passed through the communication zone 1406. To reduce the impact of this problem, it is beneficial to reduce the duration of time between receipt of the query by the RFID tag and the receipt of the return response and subsequent presentation on the display. This issue has been addressed in one manner previously by virtue of the aforementioned embodiments of the device that utilize a higher carrier frequency (e.g., 13.5 MHz) and thereby carry data to the base station 1408 at a higher data rate. As an alternative, the aforementioned duration may be shortened by reducing the amount of data that is transmitted from a given RFID tag to the base station 1408. An exemplary scheme for such a reduction in transmitted data is described with reference to FIGS. 16A and 16B (described below).

Observation of FIG. 14 reveals another challenge. As can be seen in FIG. 14, more than one animal may be in the communication zone 1406 at the same time. Consequently, as the base station 1408 transmits a query, the query is received by each of the animals in the communication zone 1406. For example, since animals 1410-1414 are simultaneously located within the communication zone 1406, each of the RFID tags attached to the animals 1410-1414 receives the query and attempts to reply with a response message frame. The response message frames from each of the RFID tags on each of the animals 1410-1414 may interfere with one another, meaning that one or more of the animals 1410-1414 may pass through the communication zone 1406 without ever having successfully transmitted its response message frame to the base station 1408. Therefore, there exists a need for a scheme by which tag-to-tag interference is reduced. Exemplary embodiments of such a scheme are presented with reference to FIG. 15.

Figure 15:
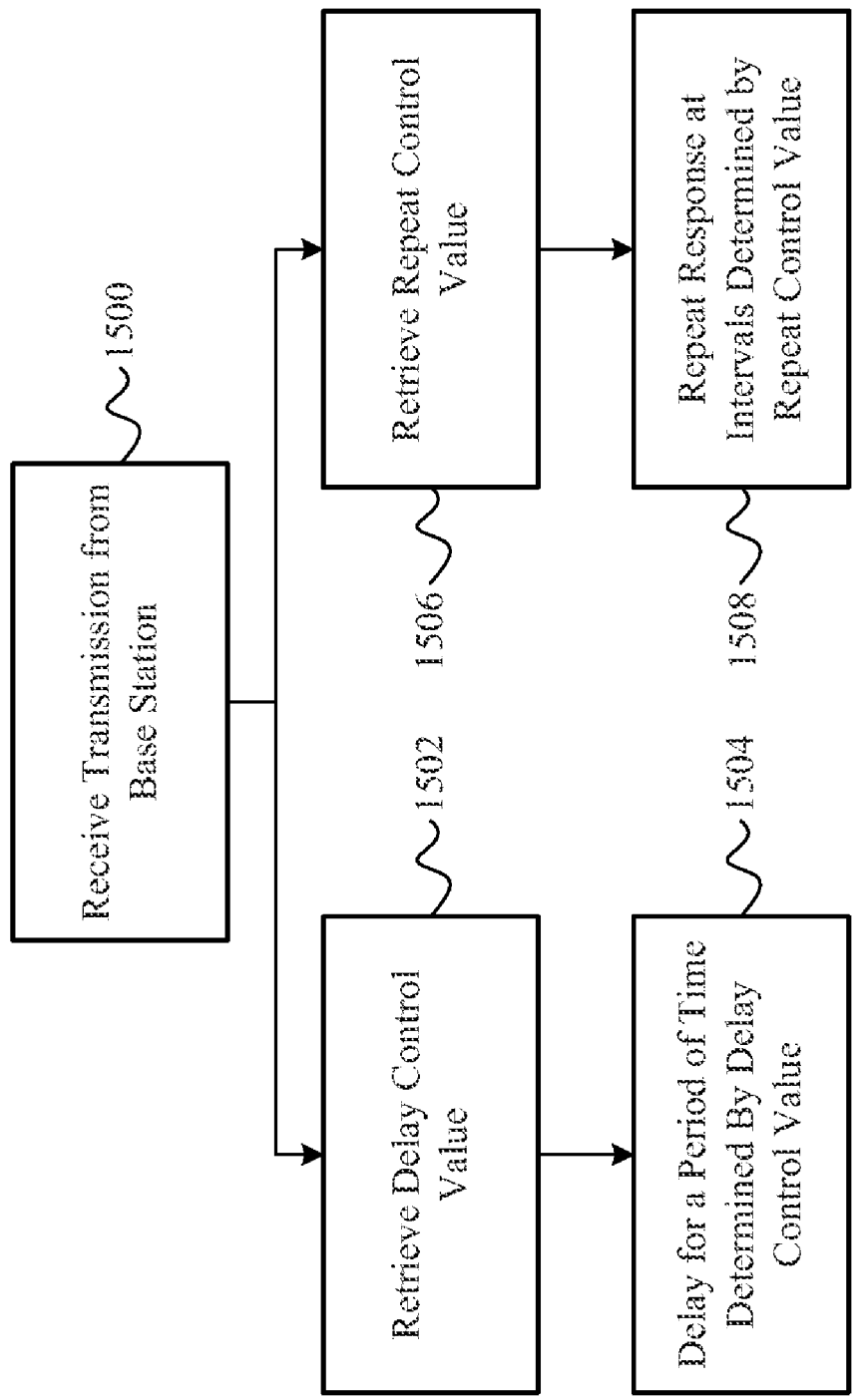
FIG. 15 is a depiction of an exemplary method of reducing interference between RFID tags.

The scheme depicted in FIG. 15 operates upon the proposition that, during manufacture, or at some point thereafter, each RFID tag is encoded with either or both of a delay control value and/or a repeat control value. Briefly, a delay control value is a number store in the memory of an RFID tag, or encoded in the circuitry thereof, which determines a duration of time the RFID tag waits from the moment it receives a query to the moment it replies with a response message frame. A repeat control value is a number store in the memory of an RFID tag, or encoded in the circuitry thereof, which determines a repetition rate at which a given RFID tag sends a set of N response message frames (e.g., an RFID tag replies to a query by the transmission of N response message frames repeated at a rate determined by the repeat control value).

FIG. 15 depicts a method by which an RFID tag may use the delay control value and/or repeat control value stored/encoded therein. As can be seen from FIG. 15, a given RFID tag initially receives a query transmission, and is thereby energized (operation 1500). Next, as shown in operation 1502, the delay control value is retrieved from memory. Thereafter, the RFID tag delays for a period of time determined by the delay control value before replying with a response message frame (operation 1504). For example, the RFID tag may include a clock circuit therein (e.g., a clock circuit may be embodied within or in communication with the transmission circuitry). The delay control value may be an integer expressing the number of clock cycles to be witnessed by the transmission circuitry before replying with a response message frame. Thus, turning to FIG. 14, the RFID tag associated with animal 1410 may be assigned a delay control value causing it to delay a period of 300 ms prior to generation of a response message frame, while animal 1412 may delay for 600 ms, and animal 1414 may wait for a period of 0 ms. The net result of the delay control values, then, is to achieve a time domain multiplexing effect, in which each RFID tag within the communication zone responds at a different point in time.

An RFID tag may also respond to the receipt of a query (operation 1500) by retrieving a repeat control value stored in memory, as shown in operation 1506. Thereafter, each RFID tag may respond to the query by transmitting a set of N response message frames with a periodicity determined by the repeat control value, as depicted in operation 1508. (Again, for example, the RFID tag may include a clock circuit with, or in communication with, its transmission circuitry, in order to control the periodicity). Thus, for example, animal 1410 may be assigned a repetition rate/periodicity of 100 ms, while animal 1412 is assigned a repetition rate of 150 ms, and animal 1414 is assigned a repetition rate of 250 ms. Thus, assuming for the sake of illustration that N=3, upon receipt of the query, each RFID tag corresponding with animals 1410-1414 replies with three identical message frames. Initially, if no delay interval is used (i.e., if operations 1502-1504 are not used), each of the transmissions interferes with one another. However, during the subsequent repetitions, each RFID tag eventually transmits a response frame that is uninterrupted by the other repeated response frames, by virtue of the variety of repeat control values assigned to each tag. It is understood that the delay and repeat schemes described by operations 1502-1504 and 1506-1508 may be used individually or in combination with one another (i.e., an RFID tag may be configured to both delay its response, and to repeat its response at a desired rate).

One underlying premise of the foregoing schemes is that the delay control values and repeat control values assigned to the RFID tags associated with the incoming animals exhibit a variety sufficient to achieve the goal of providing each RFID tag with a portion of time during which it is the only RFID tag responding to the base station. To enhance the chances of that goal being realized, the delay control values and/or repeat control values assigned to the RFID tags may be stored, so that a desired distribution of delay control values and/or repeat control values may be enforced across a set of RFID tags. For example, for a given set of RFID tags, the distribution of delay control value and/or repeat control values may be approximately Gaussian or constant (i.e., "flat").

Figure 16A:
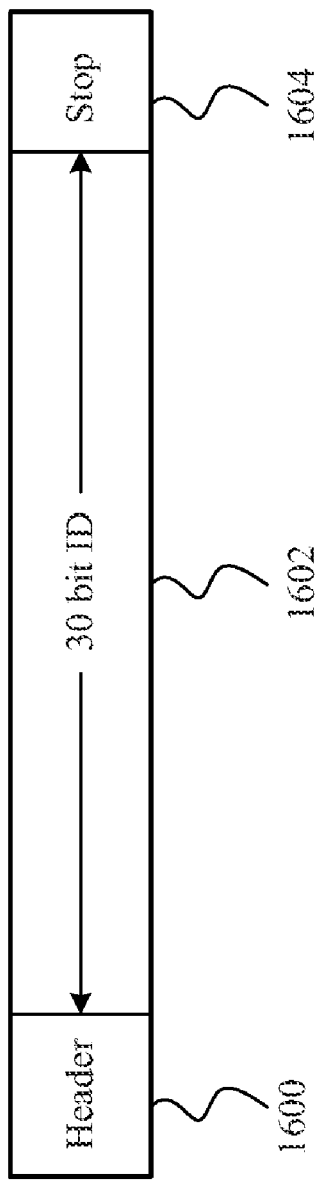
FIG. 16A depicts an exemplary embodiment of a data frame transmitted from an RFID tag to a base station.
Figure 16B:
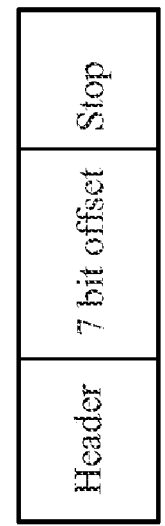
FIG. 16B depicts an exemplary embodiment of a data frame transmitted from an RFID tag to a base station.

As discussed previously, it may be desirable to reduce the amount of data transmitted from an RFID tag to the base station. FIGS. 16A and 16B illustrate a scheme by which such a reduction may be achieved. FIG. 16A depicts an exemplary (simplified) embodiment of a standard message frame transmitted from a given RFID tag to a base station, upon receipt of a query. As can be seen from FIG. 16A, the standard message frame include a header 1600, followed by 30 bits, which constitute the unique identification number 1602 assigned to a particular animal, followed by an arrangement of stop bits 1604. (30 bits is sufficient to generate over one billion unique identification numbers, and is used for the sake of illustration only. If a greater or lesser number is needed, the unique identification number may include a greater or lesser number of bits. Also, it is to be noted that the exemplary frame of FIG. 16A is simplified in that certain well understood features of communication frames are not depicted therein, because they are not of interest in this context, e.g., error correction codes, parity bits, etc.)

Turning to FIG. 16B, it can be seen that a frame of lesser length may adequately communicate the unique identification number to a base station, if the base station is seeded with a reference number to begin with. Consider, for example, the situation in which a set of one-hundred animals arriving on a transport vehicle have been assigned a set of consecutive numbers, such as 942,056,032 through 942,056,131. In such an instance, for example, it is unnecessary to transmit the entire identification code. Instead, the base station may be seeded with a reference number, which, in this case, may be equal to the smallest identification number assigned to any of the animals, i.e., 942,056,032. In the wake of having seeded the base station with the reference numeral, a given RFID tag may simply transmit the difference between the identification number assigned thereto and the reference. For example, to communicate an identification number of 942,056,051, an RFID tag need only transmit the binary sequence "10011." Thus, to accommodate a set of one-hundred animals assigned consecutive identification numbers, an offset of only seven bits need be transmitted from any given RFID tag to the base station. Such a message frame is depicted in FIG. 16B, visually revealing that such a message frame contains fewer bits, and can therefore be transmitted to the base station in a relatively shorter amount of time. As shown in FIG. 16B, the base station may use the offset to determine the actual identification number assigned to the RFID tag by adding the offset to the reference:

ID=Reference+Offset.

To permit execution of the aforementioned scheme, each of the RFID tags within assigned to a set of animals to be transported or otherwise processed as a group must be informed of the reference (so that they can calculate and subsequently transmit the offset therefrom). Further, the base station must also be made aware of the reference. Such sharing of the reference may be performed manually (e.g., an individual may enter the transport vehicle, for example, and scan each of the RFID tags with a unit programmed to identify the smallest identification number assigned to the group. Thereafter, the individual may re-scan each of the tags, to program them with the determined reference, and the individual may manually enter the reference into the base station). Alternatively, the reference may be determined automatically (e.g., the transport vehicle may be outfitted with a system that queries each of the RFID tags therein to determine the smallest identification number assigned to any RFID tag therein. Then, the system transmits that identification number to each of the RFID tags to use as the reference. Thereafter, upon arriving at the facility, the truck-based system wirelessly shares this information with the base station). Of course, the aforementioned schemes for seeding the base station and RFID tags with the reference are exemplary only. For purposes of practicing the invention, it is necessary only that the base station and RFID tag be seeded, by whatever means.

Figure 17A:
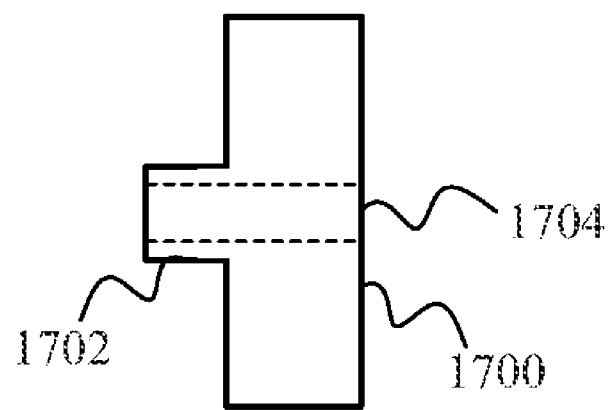
FIG. 17A is a profile depiction of an exemplary embodiment of a button-style RFID tag.
Figure 17B:
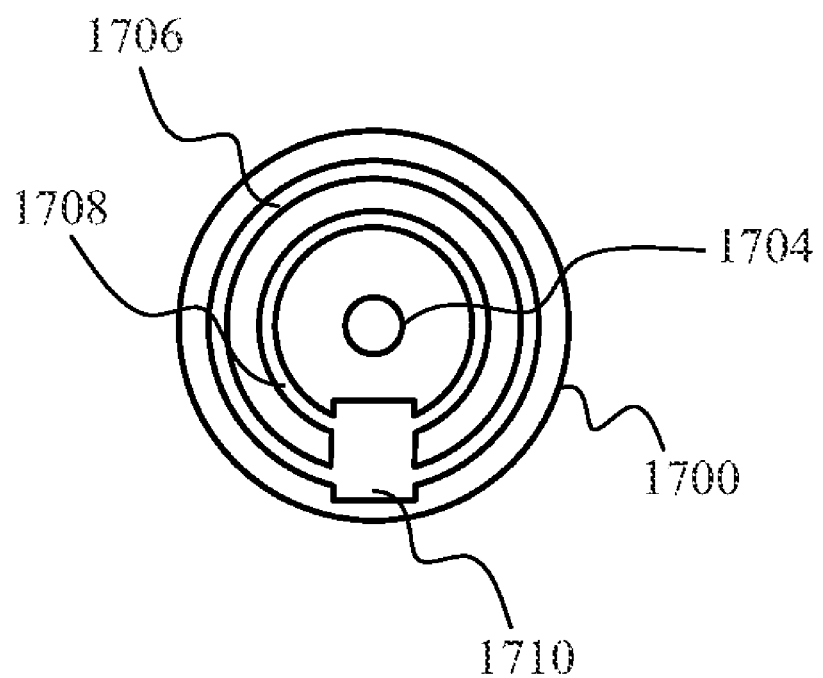
FIG. 17B is a bottom-view of the button-style RFID tag depicted in FIG. 17A.
Figure 18:
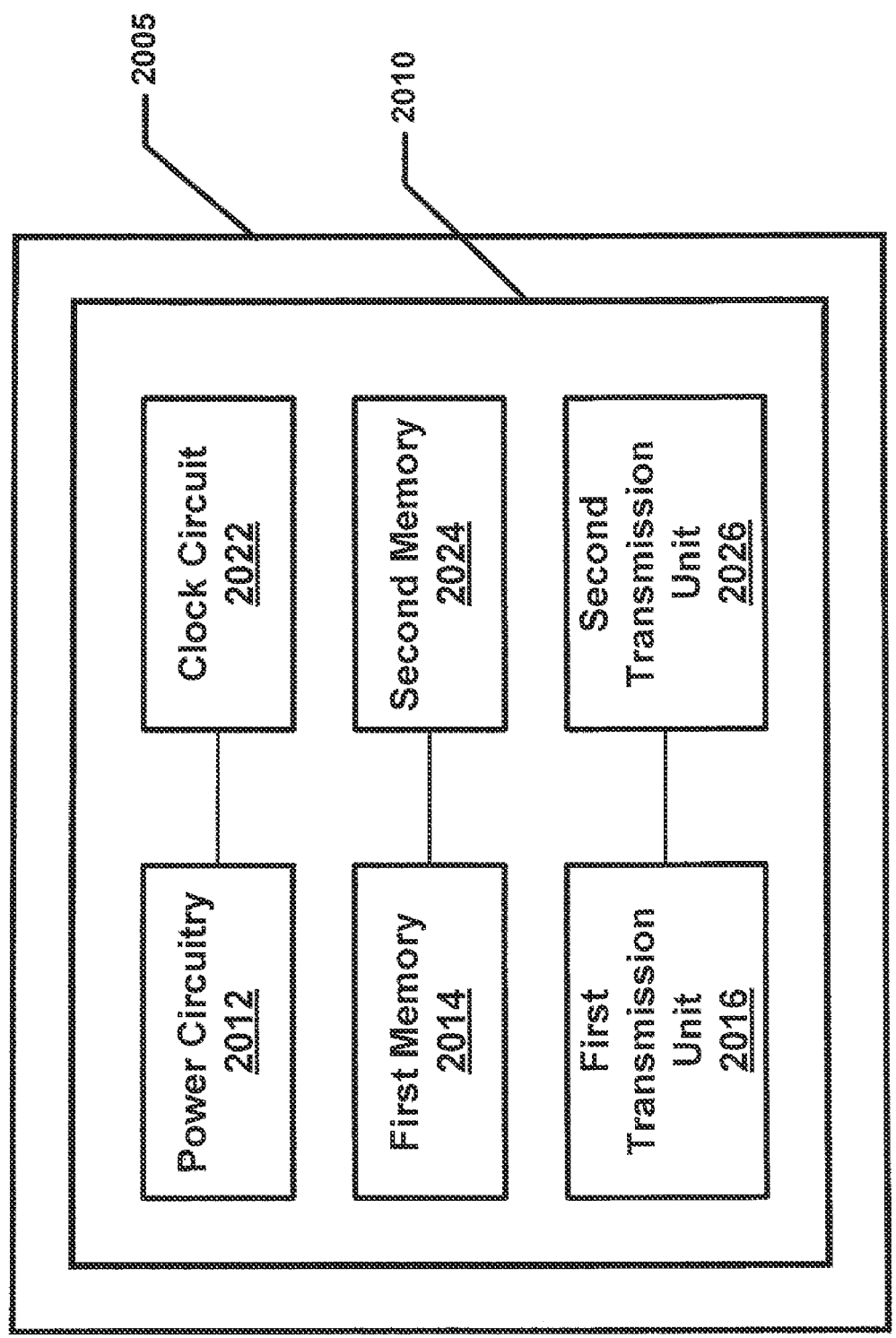
FIG. 18 is a schematic block diagram of an animal tag in accordance with the principles of the present disclosure.

FIGS. 17A and 17B depict an exemplary embodiment of an RFID tag fashioned in a "button style." FIG. 17A depicts the button-style RFID tag in profile. As can be seen in FIG. 17A, the button includes a base portion 1700 and an axially located projecting portion 1702. A channel 1704 penetrates the base portion 1700 and the projecting portion 1702. An elongated barbed "male" piece (not depicted in FIG. 17A) may extend through the "female" channel 1704, and fasten the button-style RFID tag to, for example, an animal's ear.

FIG. 17B is a bottom view of the button-style RFID tag of FIG. 17A. As can be seen from FIG. 17B, the base portion 1700 includes outer and inner circular grooves 1706 and 1708, respectively. As shown in FIG. 17B, these grooves 1706 and 1708 may be coaxial. A recess 1710 interconnects the grooves 1706 and 1708. During manufacture, a first coil antenna (not depicted) is wound around the outer groove 1706 (used, for example, for reception and transmission on a relatively low carrier frequency, such as 134.2, kHz), and a second coil antenna (also not depicted) is wound around the inner groove 1708 (used, for example, for reception and transmission on a relatively high carrier frequency, such as 13.5 MHz). One or more integrated circuits may be inserted into the recess 1710 and electrically coupled to the one or more antennas (and to one another, if one integrated circuit lends power to the other, for example). Each integrated circuit may be electrically isolated from the other integrated circuit by encasing the circuit in a polymeric capsule. Upon insertion of the integrated circuits and coil antennas into the base portion 1700, the grooves 1706 and 1708 and recess 1710 may be filled with a substance, such as a polymer, to create a smooth bottom portion 1700, and to seal the various elements within the base portion 1700.

As an alternative, there may exist but a single groove in the button style tag, such as groove 1706. A first antenna may be wound therein. Thereafter, the antenna may be electrically isolated by deposition of a material, such as a dielectric material, atop the antenna, leaving only leads to the antenna exposed for coupling to an integrated circuit. Thereafter, another antenna may be wound in the same groove, and coupled to another integrated circuit, or to the same integrated circuit. Thereafter, the groove and recess 1710 are filled in with a material, such as a polymeric material, in order to create a smooth bottom surface of the button.

According to certain embodiments of a radio frequency identification tag for identification of animals, the tag includes a first antenna 2005; and a transponder 2010 coupled to the antenna 2005. The transponder 2010 including a first transmission unit 2016, first memory 2014, and first power circuitry 2012. The first power circuitry is configured to receive a current induced in the first antenna, and to power the first transmission unit and first memory. The first transmission unit is configured to retrieve data stored in the first memory and to transmit at least a portion of the data via the first antenna on a first carrier frequency and on a second carrier frequency. In an embodiment, the transponder includes a second transmission unit 2026, and second memory 2024. In some embodiments, the transponder further includes a clock circuit 2022.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

All publications and patent applications in this specification are indicative of the level of ordinary skill in the art to which this invention pertains.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing identification of an animal, the method comprising:
   receiving a query from a base station with a radio frequency identification (RFID) tag located on an animal; and
   responding to the query with a first transmission of data from the RFID tag over a first carrier frequency and a second transmission of the data over a second carrier frequency.

2. The method of claim 1, wherein the first carrier frequency is approximately 134.2 kHz.

3. The method of claim 2, wherein the second carrier frequency is greater than 134.2 kHz.

4. The method of claim 3, wherein the second carrier frequency is approximately 13.5 MHz.

5. The method of claim 1, wherein the data includes a unique identification number.

6. The method of claim 5, wherein additional data also is transmitted upon the second carrier frequency.

7. The method of claim 5, wherein data other than the unique identification number is also carried upon the first and second carrier frequencies.

8. The method of claim 1, wherein the query comprises a transmission that energizes the RFID tag.

9. The method of claim 1, wherein the RFID tag contains a surface having printed matter displayed thereupon.

10. A method of identifying an animal to a base station with a radio frequency identification (RFID) tag, the method comprising:
    providing the base station with a smallest identification number assigned to any of a plurality of RFID tags associated with a plurality of animals;
    receiving a query from the base station with an RFID tag on the animal, the RFID tag being assigned a unique identification number; and
    responding to the received query with a reply transmission including an abbreviated identification number, which is a difference between the unique identifying number and a smallest identification number.

11. The method of claim 10, wherein the act of providing the base station with the smallest identification number comprises entering the smallest identification number into the base station manually.

12. The method of claim 10, wherein the act of providing the base station with the smallest identification number comprises sending a query to the RFID tag, the query indicating that the RFID tag is to respond with the smallest identification number and with the abbreviated identification number.

13. The method of claim 12, wherein the abbreviated identification number is transmitted to the base station on a carrier frequency of approximately 134.2 kHz.

14. The method of claim 12, wherein the smallest identification number is transmitted to the base station on a carrier frequency greater than 134.2 kHz.

* * * * *